US012757905B1

(12) United States Patent
Grall et al.

(10) Patent No.: US 12,757,905 B1
(45) Date of Patent: Oct. 13, 2026

(54) COMPOSITION OF A DOUGH BASED PASTA ITEM INCLUDING ANIMAL MEAT PROTEIN

(71) Applicant: Tyson Foods, Inc., Springdale, AR (US)

(72) Inventors: Tam Kim Grall, Naperville, IL (US); Michelle Rebecca Wellman, Chicago, IL (US); Michelle Antonia Duran, Chicago, IL (US); You-Han Chen, Chicago, IL (US); Yousef Imad Shahatit, Oak Brook, IL (US)

(73) Assignee: Tyson Foods, Inc., Springdale, AR (US)

( * ) Notice: Subject to any disclaimer, the term of this patent is extended or adjusted under 35 U.S.C. 154(b) by 317 days.

(21) Appl. No.: 17/188,070

(22) Filed: Mar. 1, 2021

Related U.S. Application Data

(60) Continuation-in-part of application No. 17/177,830, filed on Feb. 17, 2021, now Pat. No. 12,114,668,
(Continued)

(51) Int. Cl.

| | |
|---|---|
| ***A21D 13/064*** | (2017.01) |
| ***A21C 3/02*** | (2006.01) |
| ***A21C 3/04*** | (2006.01) |
| ***A21C 3/10*** | (2006.01) |
| ***A21D 8/04*** | (2006.01) |
| ***A21D 13/02*** | (2006.01) |
| ***A21D 13/043*** | (2017.01) |
| ***A21D 13/045*** | (2017.01) |

(Continued)

(52) U.S. Cl.
CPC .............. *A21D 13/064* (2013.01); *A21C 3/02* (2013.01); *A21C 3/04* (2013.01); *A21C 3/10* (2013.01); *A21D 8/045* (2013.01); *A21D 13/02* (2013.01); *A21D 13/043* (2017.01); *A21D 13/045* (2017.01); *A23B 45/10* (2025.01); *A21D 13/42* (2017.01)

(58) Field of Classification Search
USPC .......................................................... 426/557
See application file for complete search history.

(56) References Cited

U.S. PATENT DOCUMENTS 5,320,859 A 6/1994 Namdari
5,492,712 A * 2/1996 Silver .................... A23L 7/109
426/451

(Continued)

OTHER PUBLICATIONS

U.S. Appl. No. 16/284,943, filed Feb. 25, 2019 entitled "Method and Manufacture and Composition of Dough Including Protein"; Carson Joseph Ulbrich; Sherita Freeman, pp. 1-44.

(Continued)

*Primary Examiner* — Lien T Tran
(74) *Attorney, Agent, or Firm* — UB Greensfelder LLP; Mark E. Stallion

(57) ABSTRACT

A technology as disclosed and claimed herein provides a dough based pasta item or other dough based item that is a healthier alternative to conventional pastas and other dough based products. This invention results in a dough pasta item that has more protein, more complete protein, and fewer carbohydrates than conventional milled wheat dough pasta. This product turns a traditionally less-healthy food into something that has more protein and lower carbohydrates.

7 Claims, 11 Drawing Sheets

Related U.S. Application Data which is a division of application No. 16/284,943, filed on Feb. 25, 2019, now Pat. No. 11,297,843.

(51) Int. Cl.

| | |
|---|---|
| ***A23B 45/10*** | (2025.01) |
| *A21D 13/42* | (2017.01) |

(56) References Cited

U.S. PATENT DOCUMENTS

| | | | | |
|---|---|---|---|---|
| 5,817,356 | A * | 10/1998 | Gum | A23L 7/111 426/418 |
| 2005/0260321 | A1 * | 11/2005 | Weston | A23L 7/109 426/557 |
| 2007/0092619 | A1 | 4/2007 | Ning et al. | |
| 2014/0272091 | A1 * | 9/2014 | Hui | A23L 13/67 426/643 |
| 2017/0094980 | A1 | 4/2017 | Kelly | |
| 2018/0213803 | A1 | 8/2018 | Shah et al. | |
| 2018/0242596 | A1 | 8/2018 | Lych | |
| 2019/0297901 | A1 | 10/2019 | Patel | |
| 2019/0297927 | A1 * | 10/2019 | Novak | A21D 13/045 |

OTHER PUBLICATIONS

U.S. Appl. No. 17/177,830, filed Feb. 17, 2021 entitled "Method and Manufacture and Composition of Dough Including Protein"; Carson Joseph Ulbrich; Sherita Freeman, pp. 1-86.

* cited by examiner

FIG. 3A
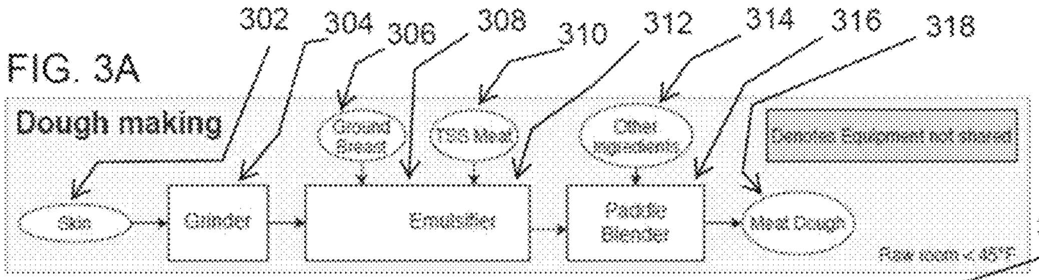
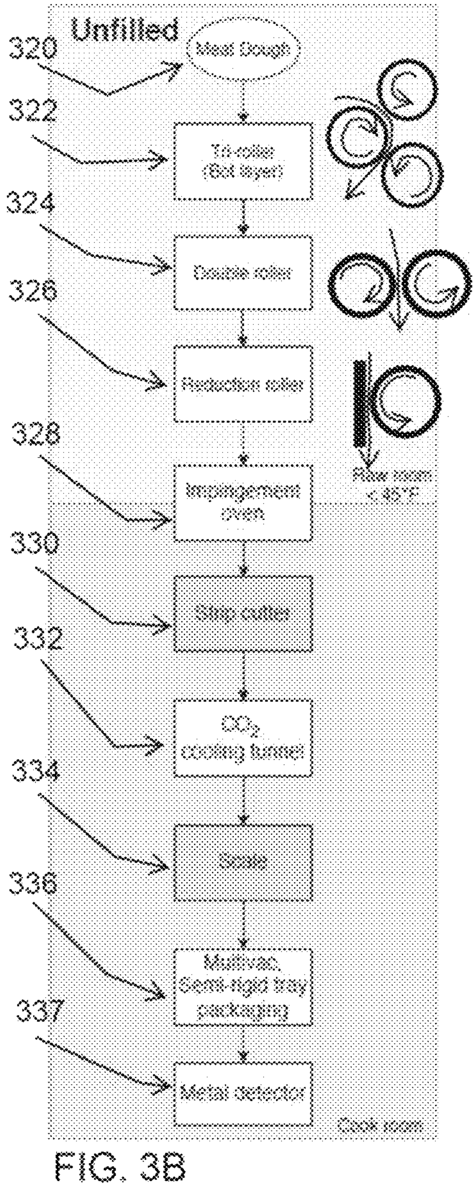
FIG. 3B
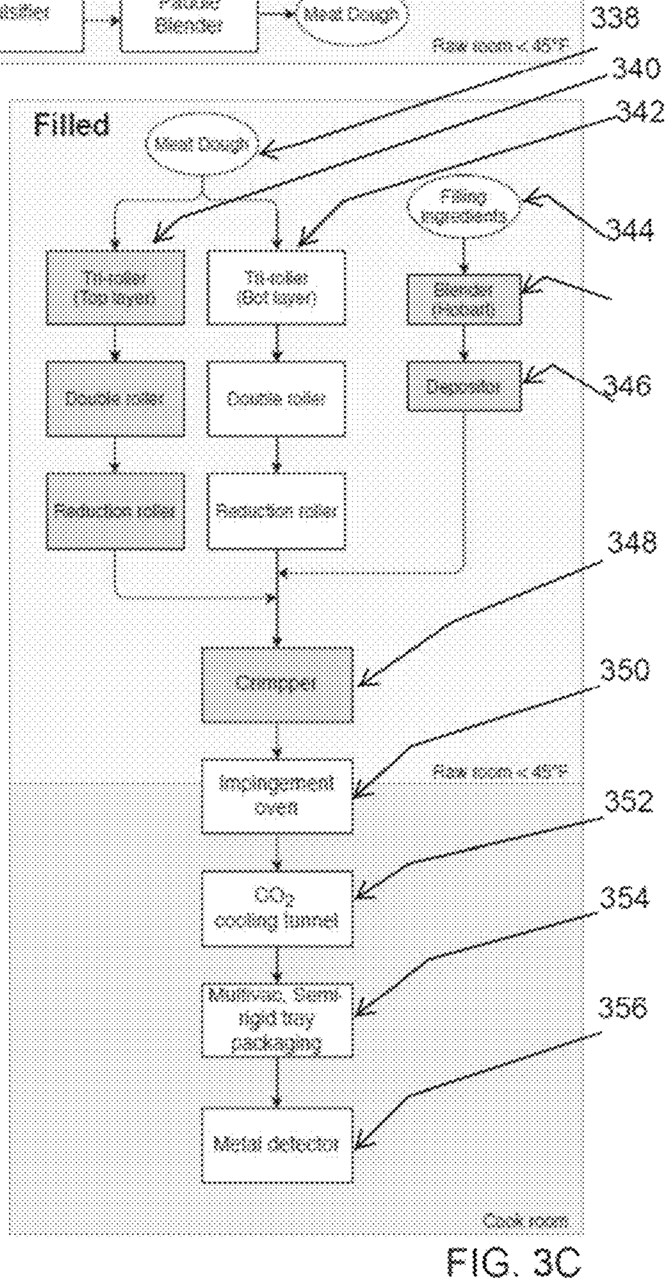
FIG. 3C

COMPOSITION OF A DOUGH BASED PASTA ITEM INCLUDING ANIMAL MEAT PROTEIN

CROSS REFERENCE

This U.S. Utility Patent Application is a Continuation U.S. Utility Patent Application that is a continuation-in-part application claiming priority to and the benefit of U.S. Utility patent application Ser. No. 17/177,830 filed on Feb. 17, 2021 Now U.S. Pat. No. 12,114,668 and entitled Method Of Manufacture and Composition Of Dough Including Protein, which is a Continuation U.S. Utility Patent Application that is a divisional application claiming priority to and the benefit of U.S. Utility patent application Ser. No. 16/284,943 filed on Feb. 25, 2019 Now U.S. Pat. No. 11,297,843 entitled Method and Manufacture and Composition Of Dough Including Protein, both of which are incorporated by reference herein in their entirety.

BACKGROUND

Field

This technology as disclosed herein relates generally to methods of manufacturing and compositions of dough and, more particularly, to methods of mixing ingredients for dough and a composition of ingredients for dough.

Background Art

In recent years, a trend in food product development has been toward providing products suitable for both quick preparation and convenient consumption. Manufacturers of these food items often produce them in shelf-ready configurations and are often provided precooked and frozen. Even though many new products meeting these needs have been introduced commercially in recent years, there remains a need for a greater variety of healthful yet convenient products. The ability to commercially produce and sell any specific food product often depends on whether the product can be produced with economies of scale or other efficiencies while still meeting the other criteria of both quick preparation and convenient consumption. Various bakery products have been developed that provide both quick preparation and convenient consumption, including various precooked pizza doughs, bread sticks, flat breads, pitas, pastas, noodles and tortillas. However, these doughs and breads don't provide much nutritional value and are higher in carbohydrates.

Dough products, generally speaking, can be difficult to manufacture in a large production environment and filled dough products even more so, can present handling and processing challenges that can be difficult to overcome while achieving the flexibility and processing speeds desirable for economical manufacturing. Dough products, whether filled or unfilled, tend to be sticky and/or tacky at some point during their manufacture resulting in the dough sticking to the manufacturing equipment that processes/works the dough, which can cause them to be difficult to handle or require equipment cleaning steps once handled. If fillings or toppings are included in a product, the steps of applying or inserting a filling or topping in a way that minimizes waste or mess can present additional challenges. Preparation of leavened/unleavened dough products may also require the dough to increase in volume upon expansion during a proofing, leavening, or rising step, or when baked. Such expansion will affect oven or proof box space, time, and possibly final packaging size requirements. With these difficulties, little has been produced in the food industry that modifies the basic dough processes in order to improve the nutritional value of the dough item itself. It would be desirable to provide new ways to achieve efficiencies in the manufacture of dough products, including filled dough products, that also improves the nutritional value of the dough product.

Tortillas are manufactured commercially by forming a dough item, flattening the dough to form dough flats, and baking the flats until they leaven and ultimately set. Representative manufacturing processes include pressing, die cutting and hand cutting. The dough typically comprises flour, a leavening system, and water. In the case of a tortilla dough, a corn system includes corn, lime and water. The leavening system comprises a leavening base and one or more leavening acids. The leavening base and leavening acid(s) react to yield carbon dioxide (neutralization reaction), which, along with any other gases present, leavens the dough. A problem that can arise during manufacture of tortillas is inadequate pliability and strength of the dough. Conventionally, modifying the dough to make it more pliable has weakened the dough. Modifying the dough to strengthen it has made it less pliable. Inadequate pliability and strength negatively impact the handling and processing of the dough as well as the properties of the end product tortilla/chip. Inadequate pliability renders the dough more difficult to handle and process. Inadequate strength reduces the ability of the dough to retain gas during handling and processing. With these difficulties, little has been produced in the food industry that modifies the basic dough processes for tortillas and other like items in order to improve the nutritional value of the dough item itself. It would be desirable to have a dough composition having excellent pliability and strength that also has increased nutritional value. It would be desirable to have a method for manufacturing tortillas wherein the tortillas have excellent physical and product properties and increased nutritional value.

A better method of manufacturing and a better composition for a tortilla dough item is needed for improving its nutritional value and that is suitable for both quick preparation and convenient consumption.

Traditionally, most pasta is manufactured by continuous, high capacity extruders, which operate on the auger extrusion principle in which mixing, kneading and extrusion are performed in a single operation. Another common process for manufacturing pasta is premixing the dough and pressing the dough through two rollers in a sheeting process until the desired thickness is reached. The manufacture of pasta includes dry macaroni, noodle, and spaghetti production. Pasta products are produced by mixing milled wheat, water, eggs (for egg noodles or egg spaghetti), and sometimes optional ingredients. These ingredients are typically added to a continuous, high capacity auger extruder, which can be equipped with a variety of dies that determine the shape of the pasta. The pasta is then dried and packaged for market.

Pasta manufacturers typically use milled durum wheat (semolina, durum granulars, and durum flour) in pasta production, although farina and flour from common wheat are occasionally used. Most pasta manufacturers prefer semolina, which consists of fine particles of uniform size and produces the highest quality pasta product. Small amounts of optional ingredients, such as salt, celery, garlic, and bay leafs, may also be added to pasta to enhance flavor. Disodium phosphate may be used to shorten cooking time. Other ingredients, such as gum gluten, glyceryl monostearate, and egg whites, may also be added. After the dough is mixed, it is transferred to the extruder. The extrusion auger not only forces the dough through the die, but it also kneads the dough into a homogeneous mass, controls the rate of production, and influences the overall quality of the finished product. Although construction and dimension of extrusion augers vary by equipment manufacturers, most modern presses have sharp edged augers that have a uniform pitch over their entire length. The auger fits into a grooved extrusion barrel, which helps the dough move forward and reduces friction between the auger and the inside of the barrel. Extrusion barrels are equipped with a water cooling jacket to dissipate the heat generated during the extrusion process. The cooling jacket also helps to maintain a constant extrusion temperature, which should be approximately 51° C. (124° F.). If the dough is too hot (above 74° C. [165° F.]), the pasta can be damaged. Drying is also an important step to control in the pasta production process. The objective of drying is to lower the moisture content of the pasta from approximately 30 to 31 percent to 12 to 13 percent so that the finished product will be hard, retain its shape, and store without spoiling. Most pasta drying operations use a preliminary drier immediately after extrusion to prevent the pasta from sticking together. Pre-drying hardens the outside surface of the pasta while keeping the inside soft and pliable or malleable. A final drier is then used to remove most of the moisture from the product.

However, as with the other dough based products described above, these dough based pastas don't provide much nutritional value. Dough products, generally speaking and more particularly dough based pastas, can be difficult to manufacture in a large production environment and filled dough based products, such as filled pastas even more so, can present handling and processing challenges that can be difficult to overcome while achieving the flexibility and processing speeds desirable for economical manufacturing. It would be desirable to provide new ways to achieve efficiencies in the manufacture of dough based pasta products, including filled dough based pasta products, that also improves the nutritional value of the dough product. A better method of manufacturing and a better composition for a dough based pasta item is needed for improving its nutritional value and that is suitable for both quick preparation and convenient consumption.

SUMMARY

A technology as disclosed herein includes a method of manufacture and composition for a dough based pasta item including protein. Dough is a thick, malleable, and sometimes elastic, paste made out of any single or combination of grains, leguminous and/or chestnut crops. Dough is traditionally manufactured by mixing flour with water and/or other liquid, and sometimes, but not always, includes yeast and/or other leavening agents as well as other ingredients such as salt, baking powder, various fats, oils and/or flavorings. One implementation of prepared shelf-ready dough based products are partially or fully cooked for both quick preparation and convenient consumption. For one implementation of dough based pastas, they are dried.

For one implementation, dough for a pasta item is manufactured by mixing milled wheat based flour (or other flour) with water and optional ingredients. For one implementation, these ingredients are added to a continuous, high capacity auger extruder, which is configured to be equipped with a variety of dies that determine the shape of the pasta. The pasta is dried and packaged for market. Pasta manufacturers for one embodiment uses milled durum wheat (semolina, durum granular, and durum flour) in pasta production, although farina and flour from common wheat for one embodiment is used, and/or a combination of soft and hard wheats are used. Small amounts of optional ingredients, such as salt, celery, garlic, and bay leafs, may also be added to pasta dough to enhance flavor. Prepared shelf-ready dough based products are partially or fully cooked and/or dried in the case of pasta, for both quick preparation and convenient consumption. A technology as disclosed and claimed herein and its various implementations and embodiments are a modified method of manufacture and a composition for a dough based pasta item that includes protein. In one implementation(s) various protein powders (chicken, beef, whey and/or vegetable protein powders) are added. For one implementation of the technology as disclosed and claimed, the protein utilized is chicken meat. For one implementation of the technology as disclosed and claimed, the protein utilized is chicken breast meat. Yet other implementations of the technology as disclosed and claimed herein utilizes one or more animal based proteins such as chicken, pork, beef, turkey, mouton, and/or other animal meat based proteins utilized individually or with other proteins. Yet other implementations of the technology as disclosed and claimed herein utilize plant based proteins, such as soybean, taken individually or combined with other animal or plant based proteins. Further, modified plant proteins can be utilized, such as plant proteins modified with higher concentration of protein or plant proteins modified to resemble the protein of animal meat.

The dough based pasta composition as disclosed and claimed herein can be manufactured using a milled wheat based flour and/or utilizing other grain based flours, such as corn, rice, barley and/or using other plant based flour and/or cricket flour. For one implementation of the technology, leguminous based flours or chestnut base flours, or various bean based powder flours, or cauliflower based powder flours are used individually or in combination with any of the other types of flours described herein. For one implementation, a tuber based flour is also utilized individually or in combination with others. An implementation of the method of manufacture and composition for dough as disclosed and claimed herein is utilized for pastas.

However, the technology as disclosed and claimed herein is adjusted to be used for various flatbreads, such as pita, pizza dough, johnnycake, focaccia, frybread, chapati, torta, bing, dosa, puri, lafa, lavash, matzah, naan, roti, sangak, pastas, noodles, tortilla and/or yufka. One implementation of the technology is also adjusted for use in pastas, noodles and/or crackers or other snack items. For one implementation of the technology as disclosed and claimed herein, the protein utilized is chicken meat. For another implementation of the technology as disclosed and claimed herein, the protein utilized is chicken breast meat. Yet other implementations of the technology as disclosed and claimed herein utilizes one or more animal based proteins such as chicken, pork, beef, turkey, mouton, and/or other animal meat based proteins utilized individually or with other proteins. Yet other implementations of the technology as disclosed and claimed herein utilize plant based proteins, such as soybean, taken individually or combined with other animal or plant based proteins. Yet another implementation utilizes distiller's grain. Further, modified plant proteins can be utilized, such as plant proteins modified with higher concentration of protein or plant proteins modified to resemble the protein of animal meat.

A technology as disclosed and claimed herein provides a dough based pasta item or other dough based item that is a healthier alternative to conventional pastas and other dough based products. This invention results in a dough pasta item that has more protein, more complete protein, and fewer carbohydrates than conventional milled wheat dough pasta. This product turns a traditionally less-healthy food into something that has more protein and lower carbohydrates. Furthermore, this dough based pasta can be a better alternative for people with health issues that are exacerbated by carbohydrates and dough based items, or those who are health conscious but like to indulge occasionally. The final product gives operators a lower carbohydrate item to add to their menu at their establishment without requiring additional equipment in the kitchen. Furthermore, consumers will feel better about eating dough based food items and serving these dough based items since the items are more protein enriched than regular dough based products and having lower carbohydrates.

The method of manufacture and the composition as disclosed and claimed herein incorporates animal protein (by way of illustration chicken) into a traditional dough based pasta. For other implementations, one or more other proteins are incorporated including, turkey, fowl, pork, beef, mouton, and/or other animal meat based proteins utilized individually or with other proteins. Yet other implementations of the technology as disclosed and claimed herein utilize plant based proteins, such as soybean, taken individually or combined with other proteins. Further, modified plant proteins can be utilized, such as plant proteins modified with higher concentration of protein or plant proteins modified to resemble the protein of animal meat. This creates a more protein enriched pasta, for both unfilled pasta and filled pasta, without sacrificing the pasta texture and flavor that consumers know and expect.

One method of manufacture includes a step of processing chicken breast meat and the natural proportion of chicken skin by finely grounding the meat protein at grinding size. For one implementation of the technology, the protein source is size reduced. The size reduction can vary among sizes less than ½ inch depending on the application. One implementation of a method for manufacture of a dough based pasta including protein includes the step of grinding poultry skin, ground chicken breast and/or dark meat (such as thigh meat, drum meat and/or back meat) and feeding the skin and meat into a meat reduction and meat emulsion system for emulsifying the size reduce meat or other non-animal based protein. Emulsifiers and stabilizers can be incorporated into a wide range of applications including bakery and confectionery, dairy and frozen desserts, beverages, oil and fats, sweet and savory snacks, meat products and more. The emulsifier and reducer in a meat system is used to solubilize (make more soluble) and reduce muscle protein. The solubilized and reduced protein is blended with other ingredients in a blender, such as a paddle blender for producing a meat dough. Xanthan gum for one implementation is used as a stabilizer and a binder. For one implementation, locust bean gum is utilized as a thickener and a stabilizer.

Generally, to emulsify or an emulsion is a colloidal suspension of two immiscible liquids (i.e. two liquids which are not soluble in each other, as in the case of oil and water). Typically, in order for a non-polar liquid to be dispersed within a polar liquid, a third component, an emulsifying agent is required for the development of a stable emulsion. The emulsifying agent acts at the interface between the fat and water to prevent coalescence of the fat (i.e. to prevent fat pockets or caps). An example of oil-in-water emulsion is mayonnaise and milk. Generally in the meat processing industry finely chopped meat mixtures are referred to as a meat emulsion. This is somewhat a misnomer as the meat emulsion consists of solid fat particles dispersed in a liquid continuous phase. In the meat processing industry, "mechanical emulsion" is often used for such mechanical mechanisms of emulsion. Chemical emulsifiers utilized in the meat and food industry, are food additives that are added to blend, for example, oil- and water-based ingredients in food formulations to keep them consistently mixed and homogeneous. Stabilizers may be added to smoothen the texture and give a definite body to food products while increasing stability and thickness. Binders help hold meat together and may add flavor; binders may improve the smoothness and consistency of and increase moisture retention for just the right amount of juiciness.

Meat proteins can serve as the emulsifying agent in a meat emulsion. To form a stable meat emulsion, these proteins must surround the finely chopped fat particles before cooking. Meat proteins vary in their basic composition of amino acid side chains. Amino acid side chains consist of either positively or negatively charged groups and may be either polar (like water) or non-polar (like fat) in nature. Myosin, the major structural protein of animal meat, can be the most important of the proteins for fat emulsification and water holding capacity of processed meats. Myosin may bridge the oil-water interface as the non-polar amino acid residues of the myosin tail would be attracted to the fat cell surface while polar amino acid residues of the myosin head would be associated with the water phase. There are a number of factors that affect the ability of myosin to emulsify fat. The first factor has to do with the basic condition of the meat at the time of use. At the time of slaughter, myosin in animal muscles is in a readily usable state, however, after rigor-mortis has set in, myosin combines together with actin to form actomyosin. Actomyosin, while not a poor water and fat binder, is not as good as myosin and not as readily solubilized at the salt levels for meat emulsions.

When used in food products, iota carrageenan and sodium stearoyl lactylate (SSL) chavean has a synergistic effect allowing for stabilizing/emulsifying that can be better than other type of carrageenan (kappa/lambda) or with other emulsifiers (monoglycerides, etc.). For one implementation, Sodium stearoyl lactylate combined with iota carrageenan is capable of producing emulsions under both hot and cold conditions using either vegetable or animal fat.

Other factors involved in the stability of meat emulsions can be affected by the addition of various dry ingredients. Water holding and emulsifying capacities of meat are greatly affected by pH, for example. Water holding capacity (WHC) is important to meat processing in that as proteins are able to hold more water they become more soluble. An increased pH affects solubility of the salt soluble muscle proteins; fat emulsifications may also increase with increasing pH. Many factors affect the pH of emulsions. Cooking can increase the pH of meat. Alkaline phosphates will increase pH of meat to the greatest extent. The WHC of a meat system is greatly affected by the addition of salt.

The pH of the meat is another factor that must be monitored, since the water-holding capacity of the meat is at its minimum at what is called the iso-electric point (pI) of proteins. The pI is the pH at which the proteins have equal positive and negative charges and therefore cannot attract more positive and/or negative charges, making them unable to bind water. The pI for fresh post-mortem beef and pork generally occurs at a pH of about 5.3. However, meat pH can be manipulated with the addition of ingredients, and increasing or decreasing pH away from the pI will create more positive and/or negative charges, allowing the proteins to bind water and fat. Salt is an excellent aid to solubilize proteins, but it can also increase the pH of the meat. Phosphates, mainly alkaline ones, will increase the pH of meat to the greatest extent.

Fat emulsification involves the reduction of fat to a small enough size that the extracted protein can coat or entrap the fat. If the fat particles are too large we will not get a smooth, stable emulsion but if the fat is chopped too much the surface area may be too large or too many fat cells may be broken to yield a stable product. Prior to cooking, meat emulsions obey Stokes law, which suggests the major factor is that the fat particle size decrease, the emulsion stability increases providing there is sufficient protein to adequately coat the fat particles. As chopping continues, emulsion temperatures cause the surface tension of the fat particles to decrease. This decrease in surface tension further enhances the particle reduction process and rapidly increases the surface area of the fat particles. As the surface area increases, more protein is required to form the protein layer that surround the fat globules. Some major factors that are important to emulsion stability include condition and species of meat, dry ingredients used, emulsification procedure, and cooking method.

Mechanical meat emulsion is a two-phase system, with the dispersed phase consisting of either solid or liquid fat particles and the continuous phase being the water containing salts and dissolved, gelled and suspended proteins. Thus they can be classified as oil-in-water emulsion. Meat emulsion is not a true emulsion since the two phases involved are not liquids and the fat droplets in a commercial emulsion are larger than 50 μm in diameter and thus do not conform to one of the requirement of a classical emulsion. Common examples of meat emulsions include bologna, frankfurters, sausages, and meat loaf. The continuous phase mainly consists of water, water-soluble proteins and salt-soluble proteins. The dispersed phase or discontinuous phase consists of fat droplets. The water-soluble proteins are sarcoplasmic proteins such as myoglobin and other pigments; salt-soluble proteins are myofibrillar proteins such as myosin, actin, and actinins.

For fat to enter the discontinuous phase, it must be transformed in very small-size particles so extracted meat proteins can coat, entrap and hold the fat droplets, creating a matrix. When chopping time is not sufficient, fat particles will be too large, resulting in an unstable emulsion. On the other hand, if excessive mechanical action is applied (e.g. too much chopping) the surface area will be too large, requiring perhaps more protein to coat the fat particles. If there is not enough protein, the result will be an unstable emulsion. Another effect of over-chopping is an increase in temperature, and depending on the type of fat, a higher or lower temperature can be dangerous (see below). Generally, high temperatures at the end of the chopping process may result in a protein coating of the fat particles that is too thick and inflexible, which will tend to fracture during fat expansion upon cooking. Thinner protein coatings will form a series of pores that could act as "escape valves" to hot expanding fat. To reduce excessive chopping, the fat portion of the emulsion initially should be ground separately from the lean tissue and added to the chopper or emulsifier later. In general, lean meat ingredients should be well ground and chopped before higher-fat ingredients are added. Final chopping temperatures for fats of beef, pork and poultry origin may therefore be below 63 degrees F., 53 degrees F. and 43 degrees F., respectively.

Non-mechanical (for example chemical and/or enzymatic) emulsifiers and stabilisers for one implementation. For some implementations, a lack of emulsifiers can result in insufficient binding, leading to a soft texture, whereas excessive amounts of emulsifier could result in a hard texture. Chemical emulsifiers may be polyglycerol fatty acid monoesters, monoacylglycerol ester of dicarboxylic acids, sucrose esters of fatty acids, polyol monoesters of fatty acids and phospholipids optionally to prepare meat analogues. Phospholipids can be used to prepare filled meat products containing substantial amounts of both meat and texturized soy based protein. Sucrose esters of fatty acids are manufactured from pure sugar and vegetable oils which can be used to improve fat dispersion and stability. For one implementation, the emulsifiers that are used in the meat include citric acid esters of mono and diglycerides of fatty acids (E472c) and mono- and diglycerides of fatty acids (E471). Mono- and diglycerides of fatty acids (E471) refers to a food additive composed of diglycerides and monoglycerides which is used as an emulsifier. For one implementation, mono- and diglycerides of fatty acids are incorporated for enhancing the binding effects of meat. In poultry based emulsions, hydrocolloids, for one implementation, are added to a coating batter to reduce oil absorption and increase moisture retention during frying. Starch and gums are used for one implementation as hydrocolloids in batter formulations to decrease oil uptake.

Stabilizers ensure homogenous distribution and consistency of the emulsion and prevent sedimentation of ingredients in the mixture and ensures the mixture remains evenly distributed. For one implementation, Guar gum as a stabilizer is used in meat protein for the dough. It has strong water holding capacity in both hot and cold water, making the guar gum a good binder and lubricant in the manufacturing process. It also performs specific functions including syneresis control, prevention of fat migration during storage, viscosity control of liquid phase during processing, and control of accumulation of the water. Locust bean gum (LBG) is a natural plant-based stabilizer contemplated herein as it exhibits clean label properties and does not bring an aftertaste; it acts as a binder and stabilizer. It exhibits a lubricating effect on the mix, which facilitates extruding and stuffing operations and yields a more homogenous product with better texture and decreases weight loss during storage. Cellulose gum is a natural polysaccharide found in all plants that is used as food additive to thicken and stabilize, and is disclosed herein as an optionally ingredient. Cellulose gum may also be added into formulations.

For one implementation, the portion of the process for making meat pasta dough is performed in a raw room, where the temperature is less than 45 degrees Fahrenheit and preferably lower than 40 degrees Fahrenheit. The raw dough temperature is preferably less than 40 degrees Fahrenheit. The meat dough is rolled through a tri-roller, a double roller and a reduction roller to progressively reduce the thickness of a sheet of meat dough. The tri-roller decreases the thickness of the dough sheet to approximately 4 mm to 6 mm The double roller further reduces the thickness of the dough to approximately 2.5 mm to 3.5 mm The reduction roller further reduces the thickness of the dough sheet to approximately 1.0 mm to 1.2 mm. For one implementation, the method of sheeting the meat dough to the desired thickness is performed by a sheeting horn. For one implementation, the sheeting horn is induction heated such that the meat dough is cooked and sheeted concurrently. The sheet of meat dough is transitioned through an oven. The cooking temperature for one implementation of traditional cooking methods ranges from 325 to 375 degrees Fahrenheit and the cooking time for one implementation ranges from four to eight minutes to thereby achieve a target internal product temperature of 170 degrees Fahrenheit as the product transitions from the oven. If the induction heated cooking horn is utilized, the cooking time is significantly less due to the fact that the interior surface of the cooking horn is in more direct contact with the dough product.

The cooked meat pasta dough sheet is fed through a strip cutter and the cut noodles are cooled in a $CO_2$ cooling tunnel or are cooled by other comparable means. The temperature in the cooling tunnel for one implementation is in the range of −20 to −40 degrees Fahrenheit. The product dwells in the cooling tunnel for one implementation in the range of 4-8 minutes to thereby achieve a target internal product temperature of less than 10 degrees Fahrenheit, and the temperature coming out of cooling and going into scaling and packaging is preferably between 27 degrees Fahrenheit and 40 degrees Fahrenheit. For one implementation, the cooling, scaling and packaging areas maintain a room temperature of less than 40 degrees Fahrenheit. For one implementation, approximately 320 to 340 calories, 24 to 34 grams of protein, 10 to 14 grams of carbohydrates, and 8-12 grams of fat are contained in every 100 grams of packaged product.

For one implementation, the meat pasta dough composition includes by weight 30% to 60% chicken or other meat protein; 20% to 30% water; 10% to 15% pea protein or other vegetable protein; 7% to 13% vital wheat gluten; 4.9% to 10% durum wheat flour (semolina); 0.5% to 2% extra virgin olive oil; 0.1% to 0.5% xanthan gum; and 0.1% to 0.5% of locust bean gum. By way of illustration, for one implementation the dough composition includes by weight, 22% to 33% chicken thigh; 7.3% to 11% ground breast; 1.8% to 3% chicken skin; 0.60% to 0.91% extra virgin olive oil (EVOO); 20% to 30% water; 8.5% to 13.0% vital wheat gluten; 11% to 16.5% Consucra M9 pea protein; 2.2% to 3.3% cane vinegar; 4.8% to 7.3% durum wheat (semolina); 1.05% to 1.57% potassium chloride; 0.20% to 0.4% xanthan gum; 0.2% to 0.4 locust bean gum; and 0.2% to 0.4% liquid rosemary extract. 8.8% to 13.2 by weight AP white flour can be used for dusting. The gums can be used as a common stabilizer used in meat products.

The gums have a strong water holding capacity in both hot and cold water as a binder and lubricant (stabilizer or thickener) in manufacturing. It also performs specific functions including syneresis control, prevention of fat migration during storage, viscosity control of liquid phase during processing, and control of accumulation of the water. Stabilizers ensure homogenous distribution and consistency of the emulsion and prevent sedimentation of ingredients in the mixture and ensure the mixture remains even. The meat pasta dough process and composition as disclosed and claimed herein can achieve can achieve 25 g of protein and 9 g of carbs, where typical pasta has about 16 g of protein and 77 g of carbs for the same amount of pasta. By way of illustration, for a 100 g serving size, the meat pasta dough has about 20 g to 28 g of protein (13 g to 18 g for normal pasta) and about 8 g to 16 g of carbs (64 g to 128 g for normal pasta). For a 114 g serving size of filled ravioli pasta, the protein included is about 22 g to 28 g (14 g to 18 g for normal pasta) and the carbs included is about 7 g to 15 g (56 g to 120 g for normal pasta).

By way of illustration, for one implementation, the dough composition includes by weight, 25% to 30% chicken; 8.5% to 9.5% ground chicken breast; 1.75% to 2.75% chicken skin; 0.5% to 1% extra virgin olive oil (EVOO); 20% to 30% water; 9% to 12% vital wheat gluten; 11% to 15% consucra M9 pea protein; 2% to 3.5% cane vinegar; 5.5% to 6.5% durum wheat (semolina); 0.75% to 1.75% potassium chloride; 0.2% to 0.4% xanthan gum; 0.2% to 0.4% locust bean gum; and 0.2% to 0.4% liquid rosemary extract. 11% AP white flour can be used for dusting.

For filled meat dough items, the meat dough sheets are produced in the same manner. The filling ingredients are blended and deposited between two or more sheets of meat dough and sections of the layers of meat dough with filling between the layers are crimped to separate a section and enclose the filling between the sheets of meat dough. The crimped away sections are baked in an oven and cooled in a cooling tunnel.

For one implementation of a filled meat dough product, the filling deposited between the layers of meat dough is a cheese filling. For one implementation of the cheese filling, the composition of the filling includes by weight, 23% to 34% whole milk ricotta; 19.0% to 28.5% water; 8.53% to 12.80% milk protein isolate; 6.44% to 9.66% heavy cream; 18.3% to 19.4% cheese (by way of illustration: 5.7% to 8.5% frozen shredded mozzarella; 6.9% to 7.2% grated parmesan; 4.5% to 5% cream cheese); 3% to 4% oat fiber; 2.5% to 3% vinegar (by way of illustration-cane vinegar); 1.3% to 2% dried cheese (by way of illustration-Vermont style spray dried cheddar); 1% to 1.2% KCL (potassium chloride); and 1% to 1.2% cheese seasoning (by way of illustration—kerry 3 cheese seasoning). By way of illustration, one implementation of a cheese filling includes by weight, 28.42% whole milk ricotta; 23.69% water; 10.66% milk protein isolate; 8.05% heavy cream; 7.11% frozen shredded mozzarella; 7.11% grated parmesan; 4.74% cream cheese; 3.55% oat fiber; 2.75% cane vinegar; 1.66% Vermont style spray dried cheddar; 1.18% KCL (potassium chloride); and 1.09% cheese seasoning (by way of illustration—kerry 3 cheese seasoning).

For one implementation of a filled meat dough product, the filling deposited between the layers of meat dough is a spinach and ricotta filling. For one implementation of the spinach and ricotta filling, the composition of the filling includes by weight, 18% to 27% whole milk ricotta; 15.6% to 23.4% water; 9.2% to 13.8% cream cheese; 7% to 10.5% IQF blanched chopped spinach; 7% to 10.5% milk protein isolate; 5.4% to 8.1% heavy cream; 9.2% to 13.8% cheese (by way of illustration—4.6% to 6.9% frozen shredded mozzarella; 4.6% to 6.9% grated parmesan; 2.4% to 3.6% oat fiber; 2.2% to 3.3% cane vinegar; 1.2% to 1.8% spinach seasoning (by way of illustration, kerry spinach roasted garlic seasoning); 0.88% to 1.32% KCL (potassium chloride); 0.48% to 0.72% spinach powder and 0.4% to 0.6% garlic puree. By way of illustration, one implementation of a spinach ricotta filling includes by weight, 23.41% whole milk ricotta; 19.5% water; 11.7% cream cheese; 8.78% IQF blanched chopped spinach; 8.78% milk protein isolate; 6.63% heavy cream; 5.85% frozen shredded mozzarella; 5.85% grated parmesan; 2.93% oat fiber; 2.77% cane vinegar; 1.56% kerry spinach roasted garlic seasoning; 1.17% KCL (potassium chloride); 0.59% spinach powder and 0.49% garlic puree.

For one implementation of a filled meat dough product, the filling deposited between the layers of meat dough is a mushroom and cheese filling. For one implementation of the mushroom and cheese filling, the composition of the filling includes by weight, 24% to 36% whole milk ricotta; 15.6% to 23.4% water; 9.8% to 14.7% IQF diced Portobello mushrooms (⅛ inch to ⅜ inch); 7.3% to 11.0% milk protein isolate; 4.8% to 7.25% heavy cream; 4.9% to 7.35% cream cheese; 3.3% to 4.95% frozen shredded mozzarella; 2.4% to 3.6% oat fiber; 2.2% to 3.3% cane vinegar; 1.64% to 2.46% onions; 1.2% to 1.8% mushroom seasoning (by way of illustration-kerry savory mushroom seasoning); 1% to 1.5% KCL (potassium chloride); and 0.1% to 0.2% yeast extract (light roast). By way of illustration, one implementation of a mushroom cheese filling includes by weight, 30.6% whole milk ricotta; 20.40% water; 12.24% IQF diced portobello mushrooms (⅛ inch to ⅜ inch); 9.18% milk protein isolate; 6.94% heavy cream; 6.12% cream cheese; 4.08% frozen shredded mozzarella; 3.06% oat fiber; 2.75% cane vinegar; 2.04% onions; 1.22% mushroom seasoning (by way of illustration kerry savory mushroom seasoning); 1.22% KCL (potassium chloride); and 0.15% yeast extract (light roast).

The method of manufacture, for one implementation, also includes a step of adding a marinade to the lean breast meat inside of a dough mixer, and it is mixed until the solution is absorbed. For one implementation, fat is added to the ground and marinated breast meat. Together, the meat and marinade mixture is mixed until all the ingredients are evenly distributed. For one implementation, the skin from the meat source is added to the mixture, such as chicken skin. The appropriate amount of flour is mixed with leavening ingredients, baking powder and other ingredients for taste.

In one implementation(s), a method of manufacture of a dough based item is disclosed comprising: mechanically emulsifying a size reduced protein; blending a quantity of vital wheat gluten, a flour, a quantity of water, an oil, the emulsified, size reduced protein and one or more of an emulsifier, binder and stabilizer, in a blender thereby forming a protein dough; extruding the protein dough through one or more of a triple roller, a double roller and a reduction roller thereby rolling the extruded dough into a sheet of protein dough having a specified thickness, cooking the sheet of protein dough at a specified temperature for a specified period of time and cutting the blended, rolled, and cooked sheet of protein dough into smaller portions; cooling the smaller portions in a cooling tunnel. In one implementation(s) the size reduced protein is one or more of a chicken meat, a turkey meat, a pork meat, a beef meat, a venison meat, a mutton meat and a plant based protein. In another implementation(s), the size reduced protein is one or more of size reduced chicken skin, chicken breast and chicken thigh. In one implementation(s), the method further includes blending one or more of xanthan gum, locust bean gum, guar gum, eggs and a protein powder. In another implementation(s), the flour is one or more of a durum wheat flour, a barley flour, an oat flour, and a potato flour. In yet another implementation(s), the protein powder is a pea powder and the oil is an extra virgin olive oil. In another implementation(s) emulsifying is for a duration of 2 to 20 minutes at a temperature of 40 degrees Fahrenheit or less and where blending is for a duration of about approximately 2-20 minutes at a temperature of 40 degrees Fahrenheit or less. In another implementation(s), cooking is for a duration of 10 seconds to 8 minutes at a temperature from 325 degrees to 375 degrees Fahrenheit to thereby achieve an internal temperature of the protein dough of at least 160 to 175 degrees Fahrenheit. In another implementation(s), cooling is for a duration of 4 to 8 minutes at a temperature between −20 degrees and −40 degrees Fahrenheit to thereby achieve an internal temperature of the protein dough at less than 10 degrees Fahrenheit. In another implementation(s), the method further comprises rolling a second sheet of protein dough and depositing a filling between the sheets of protein dough and crimping away unfilled portions of the sheets thereby enclosing the filling between the crimped sheets. In another implementation(s), the emulsified protein is blending by weight, 30% to 60% percent animal protein, 20% to 30% water, 10% to 15% pea protein, 7% to 13% vital wheat gluten, 5% to 10% durum wheat flour, 0.5% to 2% extra virgin olive oil and 0.1% to 0.5% xanthan gum.

In another implementation(s), a composition for a dough based pasta item is disclosed comprising: a meat dough composition comprising 30% to 60% percent animal protein by weight of the total mixture, 20% to 30% water by weight of the total mixture, 10% to 15% non-animal protein (optionally pea protein) by weight of the total mixture, 5% to 10% flour by weight of the total mixture, 0.5% to 2% oil by weight of the total mixture and 0.1% to 0.5% of a binder by weight of the total mixture. In one implementation(s), the dough based past, comprises (by weight of total mixture) 9% to 12% vital wheat gluten, 10.4% to 15.6% Cosucra M9 pea protein, 2% to 3.5% cane vinegar, 4.8% to 7.2% durum wheat (semolina), 0.75% to 1.75% potassium chloride, 0.2% to 0.4% xanthan gum, 0.1% to 0.5% locust bean gum, and 0.2% to 0.4% liquid rosemary extract. In one implementation(s), the animal protein comprises one or more of 25% to 30% chicken thigh; 8.5% to 9.5% ground breast, and 1.75% to 2.75% chicken skin. In one implementation(s), the flour comprises durum wheat flour and the oil comprises 0.5% to 1% extra virgin olive oil. In one implementation(s), the dough based pasta further comprises dry ingredients added for one or more of flavor and increased shelf life. In one implementation(s), the protein is ground to less than 3/32 of an inch and emulsified, or the protein is ground to less than about 2/32 of an inch and emulsified. In one implementation (s), the dough based pasta further comprises a filling composition comprising one or more of a cheese, spinach and mushroom filling.

In yet a further implementation(s), a dough based pasta product including protein is provided wherein it is manufactured by a process comprising: mechanically emulsifying a size reduced protein; blending a quantity of vital wheat gluten, flour, water, an oil, the emulsified protein and one or more of an emulsifier, binder and stabilizer, in a blender thereby forming a protein dough; extruding the protein dough through one or more of a triple roller, a double roller and a reduction roller thereby rolling the extruded protein dough into a sheet of protein dough having a specified thickness, cooking the sheet of protein dough at a specified temperature for a specified period of time and cutting the blended, rolled, and cooked sheet of protein dough into smaller portions; and cooling the smaller portions in a cooling tunnel. In one embodiment(s), the size reduced protein is one or more of a chicken meat, a turkey meat, a pork meat, a beef meat, a venison meat, a mutton meat and a plant based protein. In another implementation(s), the size reduced protein is one or more of size reduced chicken skin, chicken breast and chicken thigh. In another implementation(s), the dough based pasta product further comprises one or more of Xanthan Gum, Locust Bean Gum, Guar Gum, eggs and a protein powder. In one embodiment(s), the flour is a durum wheat flour, a barley flour, an oat flour, and a potato flour. In one embodiment(s), the protein powder is a pea powder and the oil is an extra virgin olive oil. In one embodiment(s), mechanical emulsification is for a duration of 2 to 20 minutes at a temperature of 40 degrees Fahrenheit or less and blending is for a duration of about approximately 2-20 minutes at a temperature of 40 degrees Fahrenheit or less. In one embodiment(s), cooking is for a duration of 10 seconds to 8 minutes at a temperature from 325 degrees to 375 degrees Fahrenheit to thereby achieve an internal temperature of the protein dough of at least 160 to 175 degrees Fahrenheit. In one embodiment(s), cooling is for a duration of 4 to 8 minutes at a temperature between −20 degrees and −40 degrees Fahrenheit to thereby achieve an internal temperature of the protein dough at less than 10 degrees Fahrenheit. In another implementation(s), the process further comprises rolling a second sheet of meat protein dough and depositing a filling between the sheets of protein dough and crimping away unfilled portions of the sheets thereby enclosing the filling between the crimped sheets. In another implementation(s), the emulsified protein is blended by weight, and comprises 30% to 60% percent animal protein, 20% to 30% water, 10% to 15% pea protein, 7% to 13% vital wheat gluten, 5% to 10% durum wheat flour, 0.5% to 2% extra virgin olive oil and 0.1% to 0.5% xanthan gum.

A technology as disclosed herein includes a method of manufacture and composition for a dough tortilla item including protein. Dough is a thick, malleable, sometimes elastic, paste made out of any grains, leguminous or chestnut crops. Dough is traditionally manufactured by mixing flour with water and/or other liquid, and sometimes includes yeast and/or other leavening agents as well as other ingredients such as salt, baking powder, various fats, oils and/or flavorings. Prepared shelf-ready dough based products are often partially or fully cooked for both quick preparation and convenient consumption. Dough for a tortilla is traditionally manufactured by mixing corn masa based flour with a small amount of water and/or other liquid, and sometimes includes yeast and/or other leavening agents as well as other ingredients such as salt, baking powder (a traditional corn tortilla doesn't include baking powder), various fats, oils and/or flavorings. The dough is utilized to produce several different types of dough based items including tortillas. The technology as disclosed and claimed herein and its various implementations and embodiments is a modified method of manufacture and a composition for a dough item that includes protein.

The dough tortilla composition as disclosed and claimed herein can be manufactured using a corn masa based flour and/or utilizing other grain based flours, such as, corn, rice, barley. For one implementation of the technology, other leguminous based flours or chestnut base flours, or various bean base powder, or cauliflower based powders are used individually or in combination with any of the other types of flours described herein. For one implementation, a tuber based flour is also utilized individually or in combination with others. One implementation of the method of manufacture and composition for dough as disclosed and claimed herein is utilized for tortillas. However, the technology as disclosed and claimed herein is adjusted to be used for various flatbreads, such as, pita, lafa, lavash, matzah, naan, roti, sangak, tortilla and/or yufka. One implementation of the technology is also adjusted for use in pastas, noodles and/or crackers or other snack items. For another implementation of the technology as disclosed and claimed, the protein utilized is chicken meat. For one implementation of the technology as disclosed and claimed herein, the protein utilized is chicken breast meat. Yet other implementations of the technology as disclosed and claimed herein utilizes one or more animal based proteins such as pork, beef, turkey, mouton, and/or other animal meat based proteins utilized individually or with other proteins. Yet other implementations of the technology as disclosed and claimed herein utilize plant based proteins, such as soybean, taken individually or combined with other proteins. Yet another implementation utilizes distiller's grain. It will be understood that plant based proteins includes proteins derived from the fungal kingdom as well. "Animal meat based protein," "animal based protein," "meat protein" and "animal protein" are understood to be used interchangeably and to refer to protein derived from the animal kingdom. Proteins as used in any implementation of the present technology can include one or more of: animal kingdom proteins, plant kingdom proteins, fungal kingdom proteins, cellular life proteins, non-cellular life proteins, unicellular life proteins, modified proteins, and artificially generated proteins.

The technology as disclosed and claimed herein provides a dough based tortilla or other dough based item that is a healthier alternative to conventional tortillas and other dough based products. This invention results in a dough tortilla that has more protein, more complete protein, and fewer carbohydrates than conventional wheat dough tortilla. This product turns a traditionally less-healthy food into something that has more protein and lower carbohydrates. Furthermore, this dough tortilla is a better alternative for people with health issues that are exacerbated by carbohydrates and dough based items, or those who are health conscious but like to indulge occasionally. This invention incorporates animal protein (e.g. chicken) into a traditional dough based tortilla. For other implementations, one or more other proteins are incorporated, including chicken, pork, beef, turkey, mouton, and/or other animal meat based proteins utilized individually or with other meat or plant based proteins. However processing of dough for the various implementations herein may vary depending on whether an animal based protein or a plant based protein is utilized. Yet other implementations of the technology as disclosed and claimed herein utilize plant based proteins, such as soybean, taken individually or combined with other proteins. Further, modified plant proteins can be utilized such as plant proteins modified with higher concentration of protein or plant proteins modified to resemble the protein of animal meat. This creates a more protein enriched tortilla without sacrificing the tortilla texture and flavor that consumers know and expect.

The raw chicken dough handles similarly to normal doughs. Therefore, it can potentially be made into serval different bread and pasta forms, such as flat breads, pitas, tortillas, pastas etc., however, the compositions and the processing may vary. The final product gives operators a healthier item to menu at their establishment without requiring additional equipment in the kitchen. Furthermore, consumers will feel better about eating this and serving it since it is more protein enriched than regular wheat and corn dough based tortillas.

The technology as disclosed herein includes a method of manufacture and composition for a tortilla dough item including protein. The method of manufacture includes a step of processing chicken breast meat that includes grinding chicken breast meat by finely grounding the meat protein at an about approximately 3⁄32" grinding size, plus or minus 1⁄32" grinding size. The ground chicken is mixed with corn masa, water and seasonings. The dough is pressed and par-cooked/fully cooked through a corn tortilla oven. One implementation of the composition includes at least about approximately 56 percent chicken breast meat, plus or minus 10 percent, about approximately 34 percent corn masa, plus or minus 5 percent, up to 12 percent water, plus or minus 3 percent, 0.7% salt, plus or minus 0.2 percent of the total by weight. For one implementation of the composition, the tortilla product contains more than 55% chicken breast meat of the total by weight.

An approximately 3 g chicktilla chip (tortilla chip enhanced with chicken protein) contains about approximately 0.75 g protein (25%), plus or minus 0.15 grams. For one implementation, an approximately 12 g tortilla contains about approximately 7 g protein. For one implementation, a serving size of tortillas is 46 g to 56 g, which is about 3 tortillas. For one implementation the tortilla is fried such that the chips are considered shelf stable and having lower carbohydrates (carbs) than a regular corn tortilla chip. Another implementation of the composition of the tortilla includes 60% chicken, plus or minus 2 percent, 30% corn masa, plus or minus 2 percent, 6% water, plus or minus 1 percent, and 0.7% salt, plus or minus 0.1 percent. Yet another implementation of the composition of the tortilla includes 65% chicken, plus or minus 2 percent, 25% corn masa, plus or minus 2 percent, 5.5% water, plus or minus 0.4 percent, and 0.7% salt, plus or minus 0.2 percent. Yet another implementation of the composition for the tortilla includes 52% chicken, plus or minus 2 percent, 32% corn masa, plus or minus 2 percent, 6% skin, plus or minus 1 percent, 10% water, plus or minus 2 percent, and 0.7% salt, plus or minus 0.1 percent. For one implementation of the product where the tortilla is 62% chicken, the calories per 56 g of product is approximately 150 calories, there is approximately 11 g of protein and approximately 20 g of total carbohydrates. For one implementation of the product where the tortilla is 75% chicken, the calories per 56 g of serving of product is approximately 110 calories, there is approximately 12 g of protein and approximately 12 g of total carbohydrates. For one implementation of the product where the tortilla is 56% chicken, the calories per 48 g of serving of product is approximately 120 calories, there is approximately 7 g of protein and approximately 8 g of total carbohydrates. For one implementation, the composition includes black beans for higher protein.

For various different implementations, various corn masa (grit size, whole grain, yellow vs white) distillers grain, wheat flour, various bean powders, cauliflower powder are utilized individually or in combination for varying texture and flavor. For one implementation of the composition antioxidants are included for improving shelf life quality for refrigerated items. For one implementation, various flavor enhancing ingredients are added to the composition in appropriate amounts. Various protein powders (chicken, beef, whey or vegetable protein powders) are added for one implementation. For one implementation of the technology as disclosed and claimed, the protein utilized is chicken breast meat. Yet other implementations of the technology as disclosed and claimed herein utilizes one or more animal based proteins such as pork, beef, turkey, mouton, and/or other animal meat based proteins utilized individually or with other proteins. Yet other implementations of the technology as disclosed and claimed herein utilize plant based proteins, such as soybean, taken individually or combined with other proteins. Further, modified plant proteins can be utilized, such as plant proteins modified with higher concentration of protein or plant proteins modified to resemble the protein of animal meat.

One implementation of the method of manufacture includes the step of mixing corn masa flour, which in different implementations is interchanged with different types of masa, grains or other dry ingredients, with water, at a temperature between approximately 35-50 degrees Fahrenheit for working with animal proteins. In one implementation the masa flour and water mixture is further mixed with fresh ground animal protein. For one implementation, the animal protein is chicken breast meat. The masa moisture level can vary. The amount of masa mixture will vary based on the dry ingredients and animal protein used. The mixture is pressed and cooked fully for some implementations and partially for others. The method of manufacture, for one implementation, includes only par-cooking (partially cooking) the meat tortillas for certain end uses. For example, if the meat tortilla is to be used for fried chips or a fried taquito, the method of manufacture only par-cooks at this stage, and fully cooks in a fry step.

One implementation of a method of manufacture of a dough based item includes mixing a quantity of flour, water, salt and protein in a blender, thereby forming a dough item. The method of manufacture further includes one or more of extruding/sheeting and/or pressing the dough comprising flour, water, salt and protein onto a set of rollers and thereby rolling the extruded dough in to a sheet having a specified thickness and cutting the extruded and rolled sheet into smaller pieces. The method includes baking the smaller pieces at a specified temperature and for a specific period of time; and cooling the smaller pieces in a cooling chamber. For one implementation of the technology, the flour is one or more of a corn masa flour and a wheat flour. The method of manufacture varies in that the protein is one or more of chicken meat, turkey meat, pork, beef, venison, and mutton. For one implementation of the method, mixing is for a duration of about approximately 2-20 minutes and where the water is at a temperature of 35-60 degrees.

For one implementation of the composition for a dough based item, the composition includes a dough mixture comprising 52% to 60% protein by weight of total mixture; 30% to 32% flour by weight of total mixture; approximately 9.3% water by weight of total mixture; and approximately 0.7% salt by weight of total mixture. For one implementation of the composition for a dough based item, the composition includes 1% to 6% chicken skin by weight of total mixture; and where the 52% to 60% protein is 52% to 65% chicken by weight of total mixture. For yet another implementation, the composition includes a dough mixture comprising 52% to 75% protein by weight of total mixture; 15% to 32% flour by weight of total mixture; up to approximately 9.3% water by weight of total mixture; and up to approximately 0.7% salt by weight of the total mixture.

For one implementation of the composition for a dough based item, the composition includes dry ingredients added for one or more of flavor and increased shelf life. For one implementation of the composition, chicken is approximately 52% by weight of the total mixture; the flour is approximately 32% by weight of the total mixture; the skin is approximately 6% by weight of the total mixture; the water is approximately 9.3% by weight of the total mixture and the salt is approximately 0.7% plus or minus 0.2% by weight of the total mixture. For one implementation of the composition, the flour is one or more of a corn masa flour, a wheat flour, a cauliflower powder flour; a bean based powder flour; and a tuber based flour and/or the protein is one or more of ground chicken meat protein, ground turkey meat protein, ground pork protein, ground beef protein and ground mutton protein.

One implementation of the technology as disclosed and claimed herein includes a method of manufacture and composition for a dough item including protein. Dough is a thick, malleable, sometimes elastic, paste made out of any grains, leguminous or chestnut crops. Dough is traditionally manufactured by mixing flour with water and/or other liquid, and sometimes includes yeast and/or other leavening agents as well as other ingredients such as salt, baking powder, various fats, oils and/or flavorings. Prepared shelf-ready dough based products are often partially or fully cooked for both quick preparation and convenient consumption. The technology as disclosed and claimed herein and its various implementations and embodiments are a modified method of manufacture and a composition for a dough item that includes protein. When the term protein is used herein, unless stated otherwise, is primarily referring to a protein source, such as chicken meat being a protein-meaning a source of a protein nutrient. Therefore, when discussing for example, protein being a percentage of the total weight of a composition or mixture, unless indicated otherwise, what is being referred to is the protein source being a percentage of the total weight of a composition or mixture. For example, the chicken meat (protein or protein source) is a percentage of the total weight. Also, when an animal protein source is referred to herein, such as chicken, beef, or mouton, it is primarily the portions of the animal that provide a source of protein.

The dough composition as disclosed and claimed herein can be manufactured using a wheat based flour and/or utilizing other grain based flours such as corn, rice, barley, and/or using other plant based flour and/or cricket flour. For one implementation of the technology other leguminous based flours or chestnut base flours used individually or in combination with any of the other types of flours described herein. For one implementation, a tuber based flour such as potato is also utilized individually or in combination with others such as coconut flour, cauliflower flour and almond flour, One implementation of the method of manufacture and composition for dough as disclosed and claimed herein is utilized for flatbread dough and/or pizza crust dough. However, for one implementation of the technology as disclosed and claimed herein, the technology is adjusted to be used for various flatbreads such as pita, lafa, lavash, bread loaves, biscuits, croissants, matzah, naan, roti, sangak, tortilla and/or yufka. Various other dough products can also be implemented without departing from the scope of the invention. One implementation of the technology is also adjusted for use in pastas, noodles and/or crackers or other snack items. For one implementation of the technology as disclosed and claimed, the protein/protein source utilized is chicken breast meat. Yet other implementations of the technology as disclosed and claimed herein utilize one or more animal based proteins such as pork, beef, turkey, mouton, and/or other animal meat based proteins utilized individually or with other proteins. Again, the component being added to the dough mixture is the protein source, such as a meat item. Yet other implementations of the technology as disclosed and claimed herein utilize plant based proteins, such as soybean, where a plant is the protein source, taken individually or combined with other proteins whether plant based or non-plant bases. Further, modified plant proteins can be utilized such as plant proteins modified with higher concentration of protein or plant proteins modified to resemble the protein of animal meat.

The technology as disclosed and claimed provides a dough based crust or other dough based item that is an alternative to conventional breads and crusts and other dough based products. This invention results in a dough that has more protein, more complete protein, and fewer carbohydrates than conventional wheat doughs/breads. This product turns a traditionally less-healthy food that is higher in carbohydrates into something that is enriched with protein from a protein source. Furthermore, this dough is a better alternative for people with health issues that are exacerbated by carbohydrates and dough based items, or those who are health conscious but like to indulge occasionally. This invention incorporates animal protein (for one implementation-chicken) into a traditional dough item. This creates a more protein nutrient rich bread/crust without sacrificing the bread/crust texture and flavor that consumers know and expect.

The raw chicken dough or other doughs enriched by a protein source as described herein, handle similarly to normal doughs. Therefore, it can potentially be made into several different bread forms such as pizza crusts, bread sticks, flat breads, pitas, tortillas, etc. The final product gives operators a lower carbohydrate item to add to their menu at their establishment without requiring additional equipment in the kitchen. Furthermore, consumers will feel better about eating dough based food items and serving these dough based items since the items are more protein enriched than regular wheat crust and having lower carbohydrates.

One method of manufacture includes a step of processing chicken breast meat and the natural proportion of chicken skin by finely grounding the meat protein at an approximately (3/32 inch) grinding size. For one implementation of the technology, the protein source is size reduced to less than approximately ½ inch. The size reduction can vary among sizes less than 3/2 inch depending on the application. The method of manufacture, for one implementation, also includes a step of adding a marinade to the lean breast meat inside of a dough mixer, and it is mixed until the solution is absorbed. For one implementation fat is added to the ground and marinated breast meat. Together, the meat and marinade mixture is mixed until all the ingredients are evenly distributed. For one implementation the skin from the meat source is added to the mixture, such as chicken skin. The appropriate amount of flour is mixed with leavening ingredients baking powder and other ingredients for taste. The flour/leavening/seasoning mix is added to the marinated meat mixture. These ingredients are allowed a few minutes to mix together and for one implementation shortening is added or other comparable plant based or animal based oils. The mixture is mixed until it is evenly incorporated into the dough and the dough looks “developed” and ready to form. Various size reduction methods can be used in order to size reduce the protein source, including a bowl chopper and an emulsion mill.

The dough is removed from the mixer and is portioned into dough balls using a divider rounder. The portioned dough balls are pressed into shape using a heated dough press. The formed dough is fully cooked in an oven to an internal temperature that is sufficient to fully cook the dough and the type of protein. Various animal proteins may require being cooked to an internal temperature as guided by USDA standards. For one implementation, the dough is fully cooked to an internal temperature of at least 165 F. The fully cooked bread is IQF frozen, and packaged. For one implementation of the dough technology, the dough is only partially cooked or is raw. The partially cooked or raw dough is refrigerated or frozen. For one implementation of the frozen fully cooked, partially cooked or raw dough, the product is made so that it can be topped with sauce, cheese, icing, sweet glaze and other toppings then heated and served. For one implementation the composition of the dough comprises about approximately 35% to 70% protein by weight of total mixture, about approximately 30% to 50% flour by weight of total mixture, about approximately 4% to 6% leavening ingredient; about approximately up to 10% water by weight of total mixture, and about approximately up to 1% Salt by weight of total mixture.

For one implementation of the method of manufacture, the process includes starting with a cold substrate, meat, whereas traditionally dough ingredients do not require refrigeration on the front end. This process utilizes a grinder or other size reduction device, or the meat must be ground/size-reduced prior to arriving at the dough manufacturing station. A dough mixer uses the correct mixing action to develop the dough and allow it to be removed without it sticking. For one implementation, the dough composition includes 30-50 percent chicken. One implementation of portioning the dough includes one or more traditional dough portioning methods (Divider Rounder or Dough Sheeter; traditional meat portioning methods (such as a Reiser™ Meatball Extruder); and/or other portioning equipment that is found in typical bakery and meat facilities. For one implementation, depending on the type of dough press, a heated dough press might need to be set lower than traditional settings for conventional dough products. If sheeted or pressed flat, for one implementation, the dough is docked using a docker. The dough is partially or fully cooked utilizing a linear oven or other cooking means.

One implementation of the method of manufacture of a dough based item includes chilling a protein and size reducing the protein, as needed, sufficiently for mixing, and mixing a marinade including water, phosphate and salt, and adding said marinate to the chilled and size reduced protein, and mixing flour and leavening with the chilled marinated size reduced protein to form a dough. The method of manufacture further includes portioning the dough into a dough portion for further processing. One implementation of the method of manufacture includes mixing flavor particulates with chilled marinated size reduced protein. For one implementation, the method of manufacture further includes mixing chicken skin with marinated sized reduced protein, where the protein is chicken meat.

The method of manufacture for one implementation is where the flour is one or more of a corn masa flour, a wheat flour, a cauliflower powder flour; a bean based powder flour; and a tuber based flour, and/or the protein is one or more of ground chicken meat protein, ground turkey meat protein, ground pork protein, ground beef protein and ground mutton protein. For other implementations, other size-reduction methods are utilized to size-reduce the protein source. The method of manufacture for yet another implementation includes heat pressing the dough portion into a flattened dough portion, docking the flattened dough portion, and cooking the flattened dough portion, whereby the portioning is performed with a divider rounder. The method of manufacture for yet another implementation includes docking a dough sheet, die cutting the docked dough sheet, and cooking the docked dough sheet, where portioning is with a dough sheeter portioning into a dough sheet. For another implementation portioning is performed with an extruder and an extrusion cutter.

One implementation of the technology as disclosed and claimed herein is a composition for a dough based item, which includes a dough mixture including about approximately 35% to 60% protein by weight of total mixture, about approximately 35% to 55% flour by weight of total mixture, about approximately 1% to 6% leavening ingredient, about approximately less than 5% water by weight of total mixture and about approximately up to 2% Salt by weight of total mixture. For another implementation the composition for a dough based item includes about approximately 10% to 20% Skin by weight of total mixture, and for one implementation, where the protein is about approximately 60% to 80% chicken by weight of total mixture and/or the skin is chicken skin. One implementation of the composition for a dough based item includes, dry ingredients added for one or more of flavor and increased shelf life.

The composition for a dough based item for yet another implementation is where chicken protein is about approximately 20% to 50% by weight of the total mixture, flour is about approximately 50% to 70% by weight of the total mixture, leavening ingredient is about approximately 1% to 6% by weight of the total mixture, the skin is about approximately 2% to 10% by weight of the total mixture, the water is about approximately 2% to 6% by weight of the total mixture and the salt is about approximately up to 2% by weight of the total mixture. For one implementation the composition for a dough based item, the flour is one or more of a corn masa flour, a wheat flour, a cauliflower powder flour; a bean based powder flour; and a tuber based flour, and where the protein is one or more of ground chicken meat protein, ground turkey meat protein, ground pork protein, ground beef protein and ground mutton protein. For various implementations, the protein source by weight of total mixture can range from about approximately 5% to about approximately 80%. For one implementation the composition for a dough based item includes a dough mixture including approximately 20% to 80% protein source by weight of total mixture; and approximately 15% to 55% flour by weight of total mixture.

The features, functions, and advantages that have been discussed can be achieved independently in various implementations or may be combined in yet other implementations, further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIGS. 3A, 3B and 3C are an illustration of the manufacturing stations and process flow;

Figure 1:
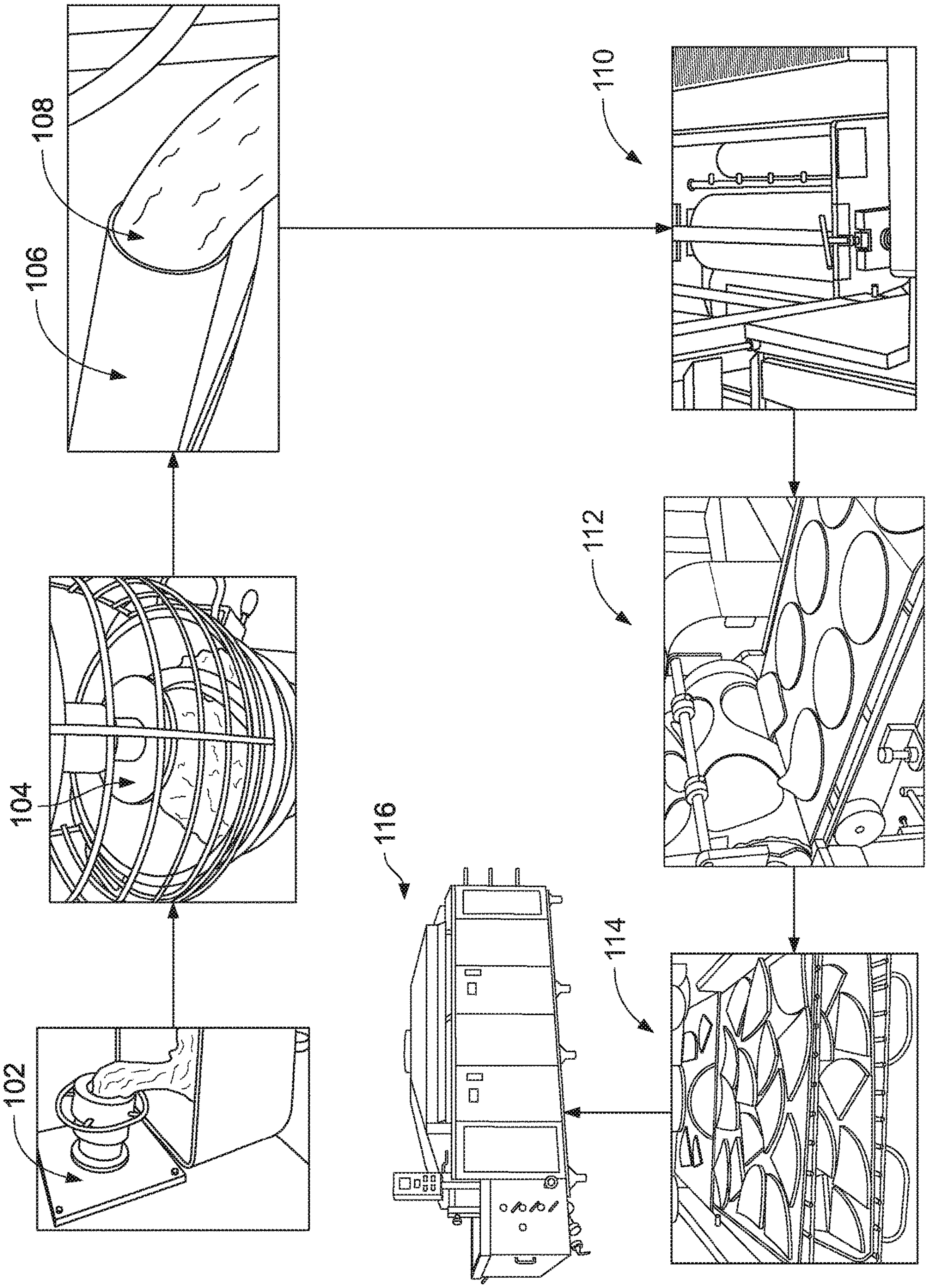
FIG. 1 is an illustration of the manufacturing stations and flow.
Figure 2A:
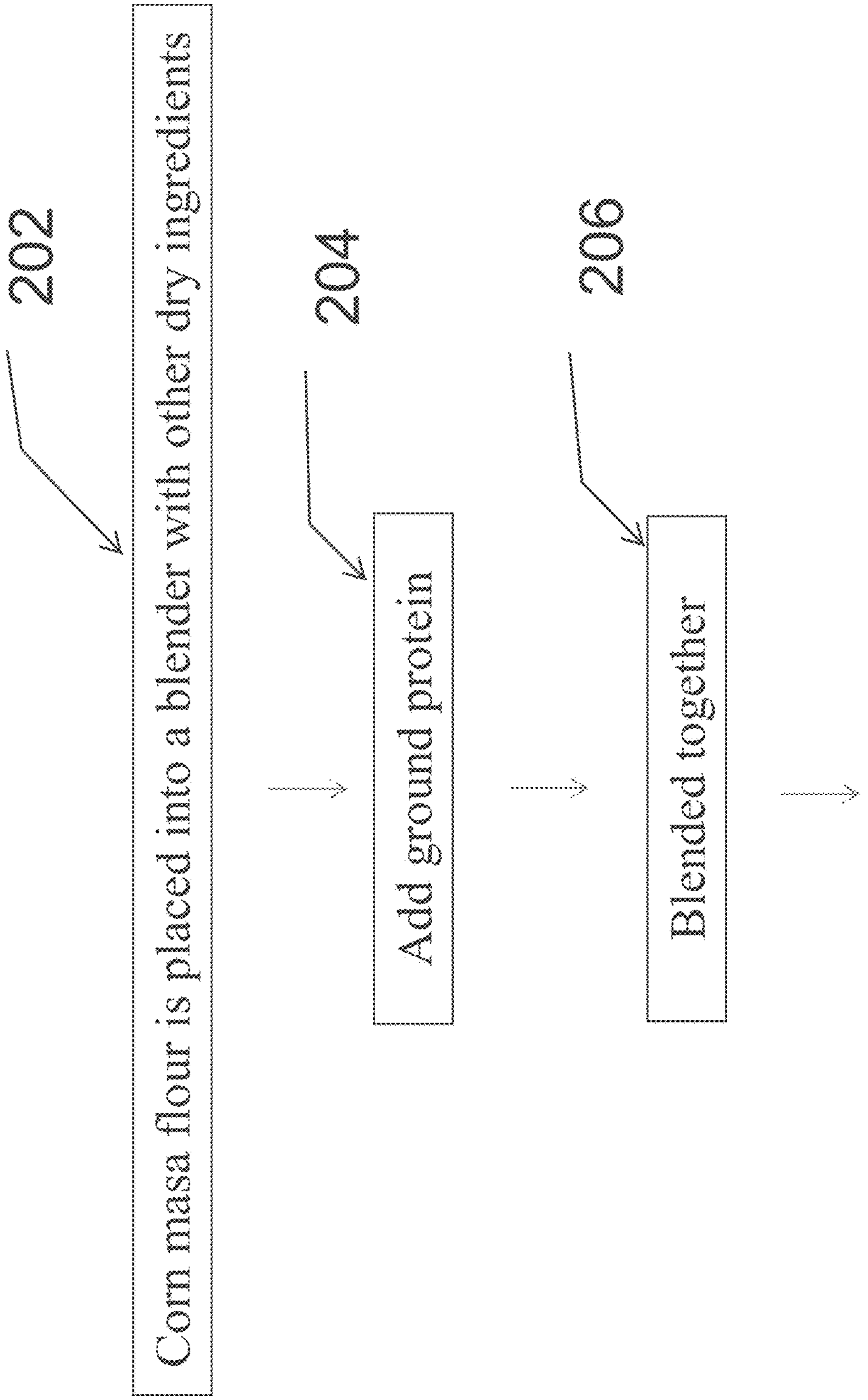
FIGS. 2A through 2E are an illustration of a process flow of the manufacturing method.
Figure 2B:
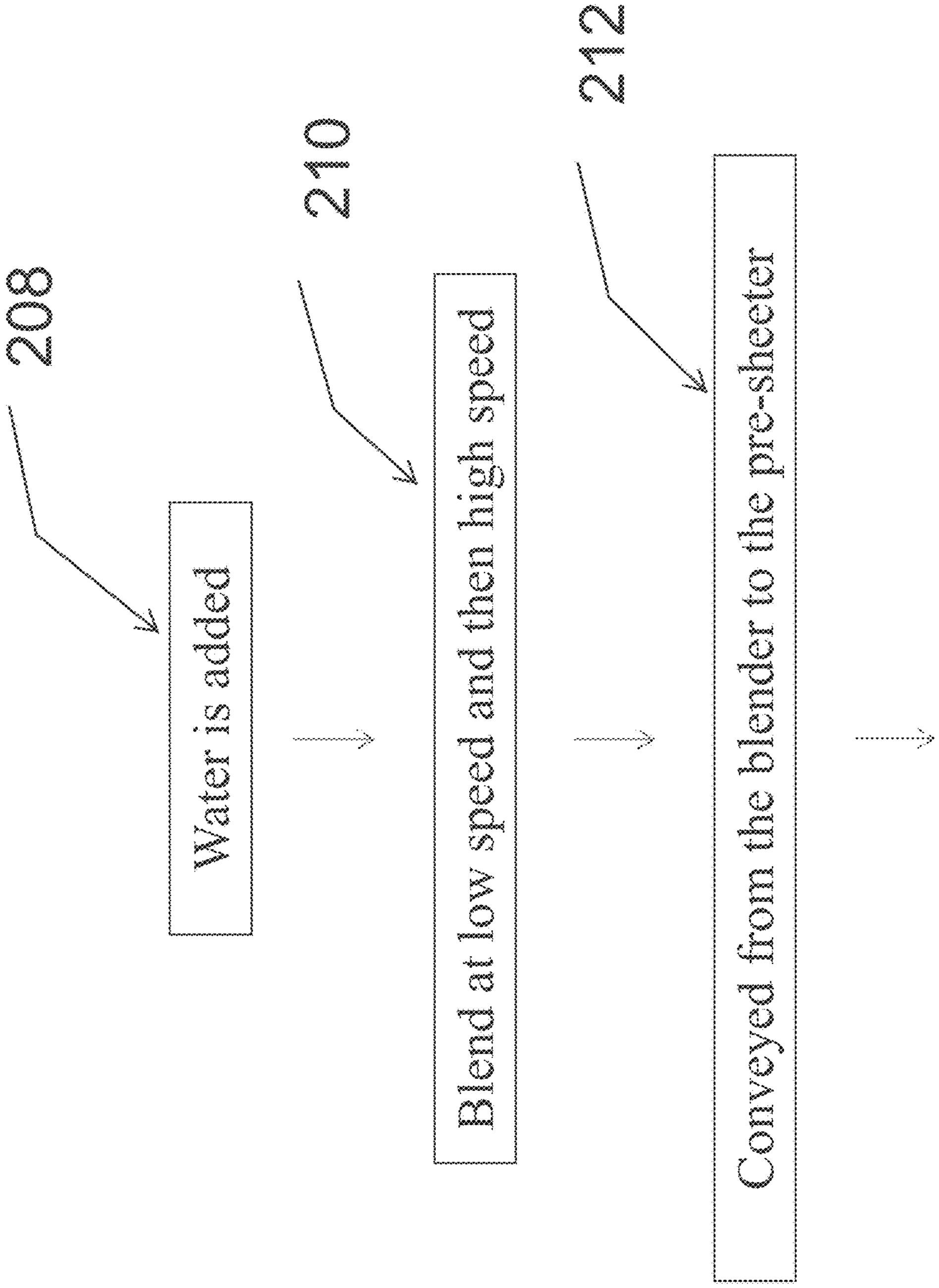
Figure 2C:
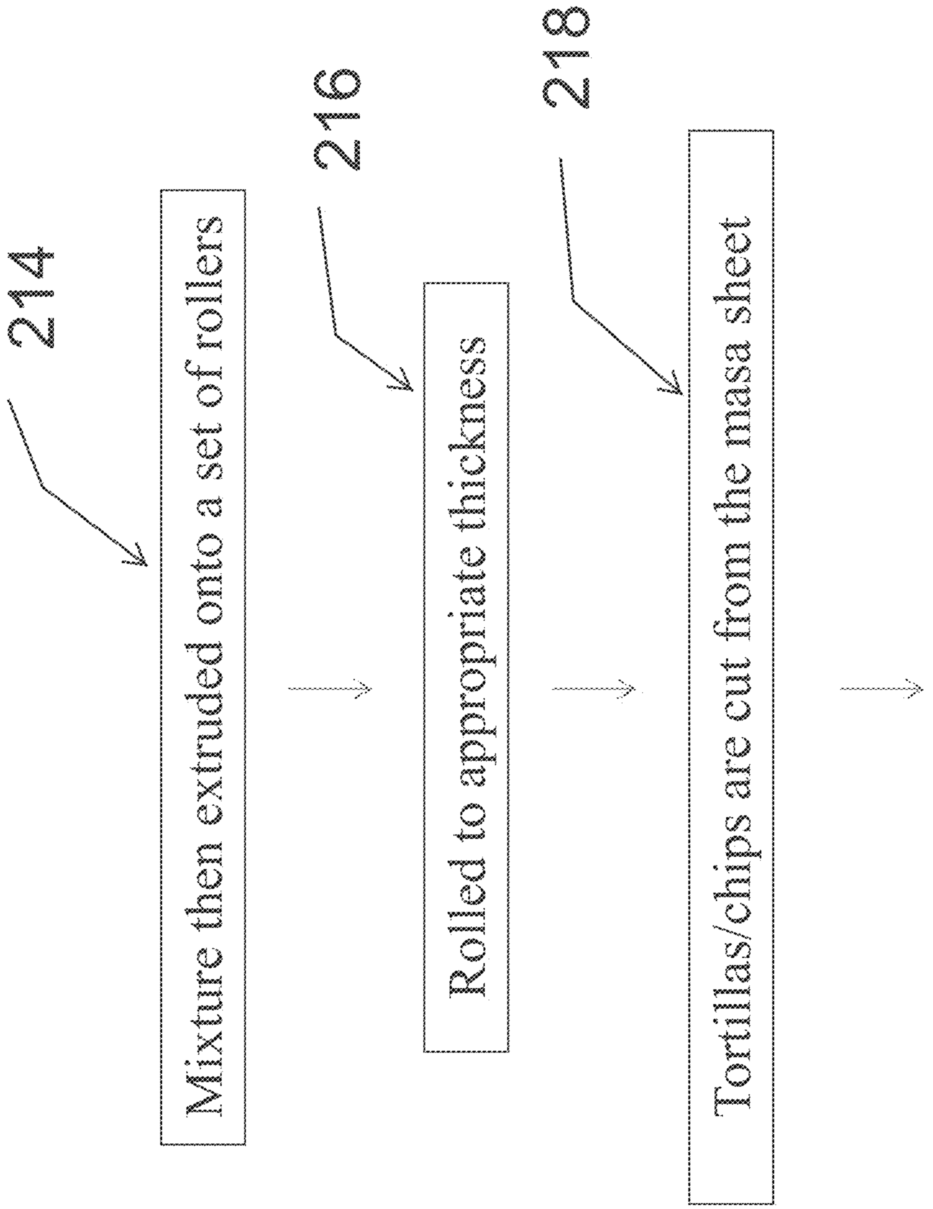
Figure 2D:
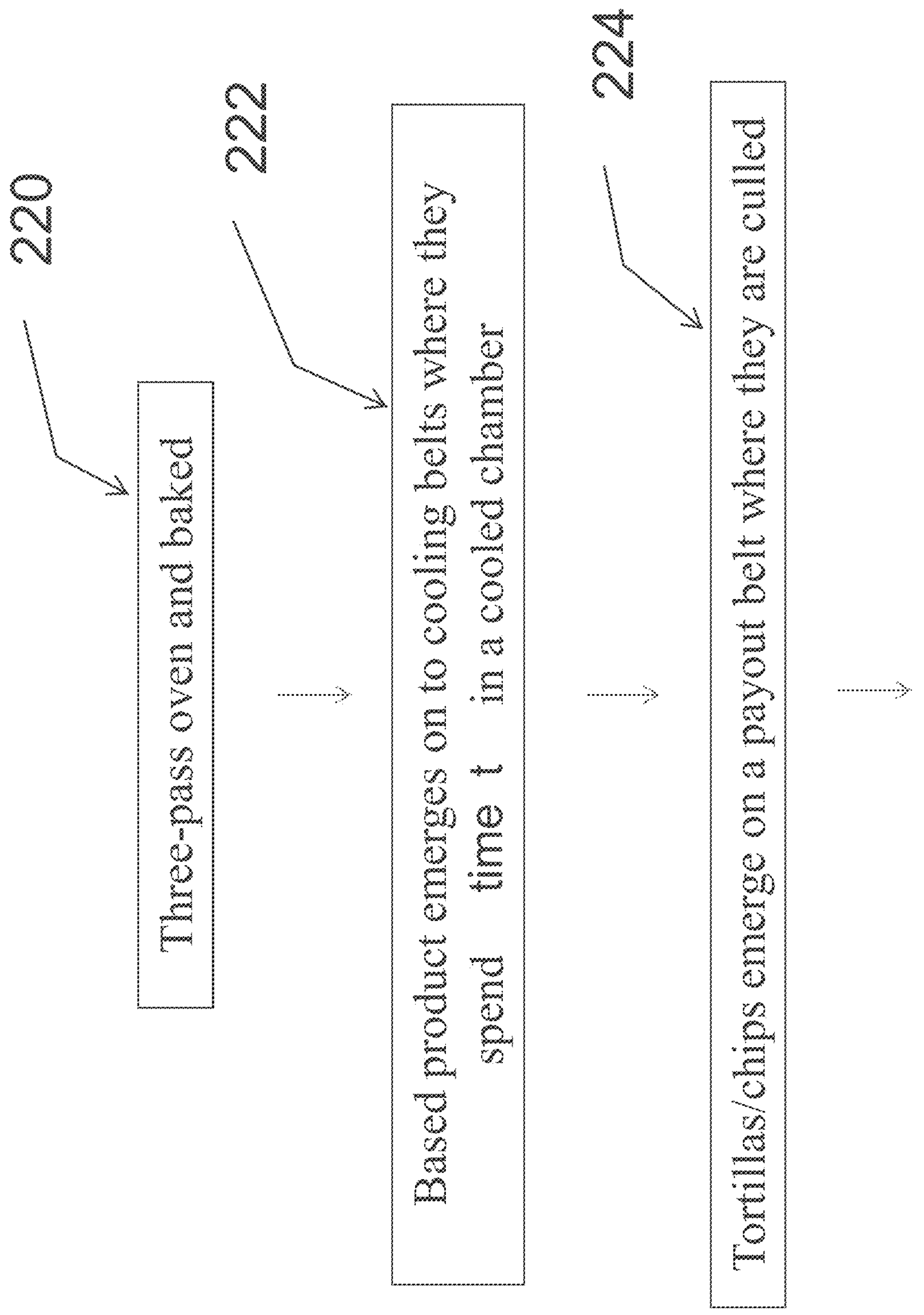
Figure 2E:
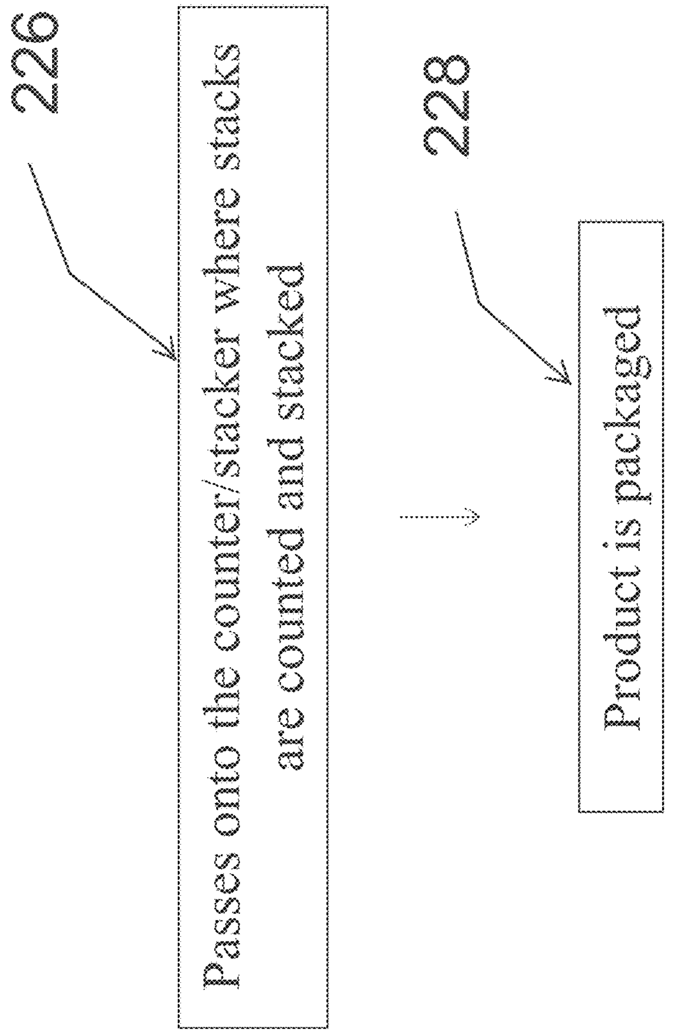

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIGS. 1-4 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified. Reference in the specification to "one embodiment" or "an embodiment"; "one implementation" or "an implementation" means that a particular feature, structure, or characteristic described in connection with the embodiment or implementation is included in at least one embodiment or implementation of the invention. The appearances of the phrase "in one embodiment" or "in one implementation" in various places in the specification are not necessarily all referring to the same embodiment or the same implementation, nor are separate or alternative embodiments or implementations mutually exclusive of other embodiments or implementations.

Dough Based Item for Tortilla:

One implementation of the present technology as disclosed comprising a method of manufacture and a composition for a dough tortilla including protein teaches a novel method of manufacture and composition for a dough tortilla having increased nutritional value as compared to traditional dough items.

The details of the technology as disclosed and various implementations can be better understood by referring to the figures of the drawing. Referring to FIG. 1, an illustration of the various process stations is provided. The process stations shown are an illustration. The method of manufacture includes the process step of placing corn masa flour into a blender with other dry ingredients and blended together at a blending station 104. Water is added, and ingredients mixed to rehydrate the masa flour at the blending station 104. Size reduced chilled animal protein 102 is added to the mixture where size reducing the protein is performed by using a meat grinder at the size reduction station 102. The mixture is blended at low speed and at a high speed. The masa mixture is conveyed 106 from the blender to the pre-sheeter station 110 by belts or pumped through pipes and cones to the sheeter. The masa mixture having animal protein is extruded 108 onto a set of rollers (stainless steel sandblasted or coated with Teflon® for a non-stick surface), and rolled to an appropriate thickness and the masa sheet is cut to a size for tortillas and/or chips at a tortilla cutting station 112 or a chip cutting station 114. The tortillas/chips enter a three-pass oven and are baked at a baking station 116.

Referring to FIGS. 2A through 2E, a process flow of the manufacturing method is provided. The method of manufacture includes the process step of placing corn masa flour into a blender with other dry ingredients and blended together 202 for 30-60 seconds. Water is added 208, where the water temperature is 35-50 degrees Fahrenheit, and ingredients mixed to rehydrate the masa flour. Ground, chilled animal protein, chilled at a core temperature of about approximately 36 degrees Fahrenheit, plus or minus 3 degrees Fahrenheit, and is added 204 to the mixture where the grind of the animal protein is at 3/32", plus or minus 1/32", using a meat grinder. The mixture is blended 206 at low speed 210 in a sigma blade type mixer at a speed of at about approximately 60 rpms, plus or minus 5 rpms, and at a high speed 210 at a speed of about approximately 90 rpms, plus or minus 10 rpms, for 2-10 minutes total mix time. The masa moisture is 48-50% and masa temperature is 35-40° F. For one implementation of the process, the equipment is a sigma blade mixer from Peerless, or JC Ford™ or a mixer providing comparable mixing agitation action.

The masa mixture is conveyed 212 from the blender to the pre-sheeter by belts or pumped through pipes and cones to the sheeter. For one implementation of the process, the equipment is a JC Ford® twin screw extruder or Waukesha® pumps or a substantially similar extruder and pump. Although the equipment may vary depending on the application. The masa mixture having animal protein is extruded 214 onto a set of rollers (stainless steel sandblasted or coated with Teflon® for a non-stick surface), and rolled to an appropriate thickness 216 and the masa sheet is cut to a size for tortillas and/or chips 218. For one implementation, the specified thickness is about approximately 1/16 inch(es) to about approximately 1/4 inch(es). The cutter size and shape depends upon desired product and is made from ultra-high-molecular weight polyethylene (UHMW) or brass materials. For one implement of the process, the equipment is a sheeter and cutter from Casa Herreram or JC Ford™ or comparable piece of equipment.

The tortillas/chips enter a three-pass oven and baked 220 with slatted belt material for 16-30 seconds at 300-600 degrees Fahrenheit depending on oven functional status. Product temperatures are above 165 degrees Fahrenheit, plus or minus about approximately 25 degrees Fahrenheit upon exit. Products that need to be par-cooked for function purposes, will have temperatures between 150-155 degrees Fahrenheit and will be cooked for 20-25 seconds of time. For implementation of the process to produce tortilla chips, the temperature is lower. For one implementation of the process, the equipment is ovens from Casa Herreram or JC Ford™ or a substantially similar piece of equipment. For one implementation of the process, for tortillas having chicken, the temperature will have an exit temperature of 200-250 degrees Fahrenheit and will be cooked for 20-30 seconds. The baked product emerges on to cooling belts where they spend 1-2 minutes in a cooled chamber 222. Target packaging temperatures is less than 70 degrees Fahrenheit. For one implementation of the process, the equipment cooling belts are by Casa Herrera™ and JC Ford™ or comparable equipment manufactured to meet cooling requirements. After cooling, the tortillas/chips emerge on a payout belt where they are culled 224. For one implementation of the process, the cull equipment is the Lawrence Equipment™ Accuview™ or a comparable piece of equipment. For one implementation of the process, the baked corn chips are scanned for metal. For one implementation of the process, the metal detection equipment is the Safeline™ and Ceia® or comparable material.

The tortilla product passes onto the counter/stacker where stacks are counted and stacked 226 and released to a package 228. For one implementation of the process for stacking and counting, the equipment is a counter and stacker by Casa Herrera™ or JC Ford™ or substantially similar piece of equipment. The tortilla product is conveyed up a bucket elevator and deposited into poly lined cases and weighed at net case weights. For one implementation of the technology, the equipment is a Casa Herreram or JC Ford™ weigh scale systems. The product is packaged. For one implementation of the process, the tortilla product is manually placed into poly bags and taped close. One implementation for the process of sealing the product into poly bags includes gas flushing and/or vacuum sealing. For one implementation of the process, the equipment is an InnoSeal® or Novum, tape closer and poly non-barrier bags from Nex Gen, or a substantially similar product. The tortilla chip product is bulk packaged into poly lined cases. The packaging for the product, for one implementation, is one or more of gas flushed and vacuum sealed.

For one implementation of the product where the tortilla is 62% chicken, the calories per 56 g of product is approximately 150 calories, there is approximately 11 g of protein and approximately 20 g of total carbohydrates. For one implementation of the product where the tortilla is 75% chicken, the calories per 56 g of serving of product is approximately 110 calories, there is approximately 12 g of protein and approximately 12 g of total carbohydrates. For one implementation of the product where the tortilla is 56% chicken, the calories per 48 g of serving of product is approximately 120 calories, there is approximately 7 g of protein and approximately 8 g of total carbohydrates.

Doug Based Item for Pizza Crust Dough or Other Bread Item:

For One implementation of the method of manufacture, the process for making a dough based pizza crust or other bread item includes providing a protein such as meat, and grinding the meat at a grinding station. A mixer station is used to mix the ground meat and flour and other ingredients, if any, with the correct mixing action to develop the dough and allow it to be removed without it sticking. The mixed dough is extruded to a dough portioner/dough divider station where the dough is portioned. One implementation of portioning the dough includes one or more traditional dough portioning methods (Divider Rounder or Dough Sheeter; traditional meat portioning methods (such as a Reiser™ Meatball Extruder); and/or other portioning equipment that is found in typical bakery and meat facilities. For one implementation, depending on the type of dough press, a heated dough press is utilize and might need to be set lower than traditional settings for conventional dough products. If sheeted or pressed flat, the dough will need to be docked using a docker. The dough is partially or fully cooked utilizing a linear oven.

For one implementation of the method as disclosed herein is, a lean meat product is chilled in a cold storage area for a time until the lean product (protein source) is brought to a core temperature of specified degrees Fahrenheit, which may vary based on the type of protein. For one implementation of the method of manufacture, the lean product (protein source) is chicken breast meat. For other implementations one or more of the following animal proteins can be utilized including animal based proteins such as pork, beef, turkey, mouton, and/or other animal meat based proteins utilized individually or with other proteins. Yet other implementation of the technology as disclosed and claimed herein utilizes plant based proteins, such as soybean, taken individually or combined with other proteins. The chilled chicken breast meat is finely ground 204 at 3/32 inch(es), plus or minus 1/8 inch(es), using a meat grinder. For one implementation, the method of manufacture includes a step of adding a marinade to the lean breast meat inside of a dough mixer, and it is mixed until the solution is absorbed. For an implementation where marinade is used, for one implementation the marinate includes cold water at a temperature of about approximately 36 degrees Fahrenheit, plus or minus about 4 degrees Fahrenheit and at an amount of 10 percent, plus or minus 5 percent of the total weight of the ground meat and marinate, phosphates at about 0.3 percent, plus or minus 0.2 percent of the total weight of the ground meat and marinate, and salt at about 0.5 percent, plus or minus 0.2 percent of the total weight of the ground meat and marinate. The marinate is mixed and it is added to the meat. For one implementation of the method, fat and a natural proportion of associated chicken skin with respect to the chicken breast is chilled in cold storage for a time appropriate for the protein. However, for one implementation, the protein, fat and/or skin need not be chilled. The chilled fat and or chicken skin (or un-chilled) is finely ground 212 at 3/32" using a meat grinder. The finely ground fat and/or skin is added to the ground and marinated breast meat. The fat and/or skin is added at an amount of 15 percent, plus or minus 5 percent of the total combined weight of the ground meat, marinate and fat/skin. Together, the meat, fat/skin, and marinade mixture is mixed for about approximately 5 minutes and/or until all the ingredients are evenly distributed.

The appropriate amount of flour is mixed with leavening ingredients and other ingredients for taste. The flour/leavening/seasoning mix is added to the marinated meat and skin. The flour is added at an amount of 50 percent, plus or minus 20 percent of the total weight of the dough. The leavening ingredients are added at an amount of 7 percent, plus or minus 5 percent of the total weight of the dough. For yet another implementation flavor ingredients are added at an amount of 3 percent, plus or minus 2.5 percent of the total weight of the dough. These ingredients are allowed a few minutes, such as 3 minutes, plus or minus 1 minute, to mix together and shortening is added.

For one implementation shortening is added at an amount of 5 percent, plus or minus 5 percent of the total weight of the dough. The mixture is mixed until it is evenly incorporated into the dough and the dough looks "developed" and ready to form. The dough is removed from the mixer is portioned into dough balls using a divider rounder or is portioned using other portioning methods as seen in. The portioned dough balls, having a weight of about approximately 130 g, plus or minus 10 g, are pressed into shape using a heated dough press where the heated dough press is at a temperature of 200 degrees Fahrenheit, plus or minus 25 degrees Fahrenheit. For one implementation the press temperature is colder to minimize shriveling of the product. The pressed dough is processed through a docker, which is essentially a spiky rolling pin that punctures small vent holes in the dough to prevent the dough from blistering and from rising in large uneven pocket areas during the baking/cooking process. The formed dough is fully cooked in an oven for 3 minutes, plus or minus 2 minutes, and/or to an internal temperature of at least 165 degrees Fahrenheit. The fully cooked bread is IQF (individual quick freeze) frozen, and packaged. For one implementation, the frozen chicken dough product is made so that they can be topped with sauce, cheese, icing, sweet glaze and other toppings then heated and served.

For one implementation a dough sheet is processed through a docker, which is essentially a spiky rolling pin that punctures small vent holes in the dough to prevent the dough from blistering and from rising in large uneven pocket areas during the baking/cooking process. The spike density/pattern of the docker can be at least one spike per square inch.

For one implementation, the dough portioning is performed with a dough sheeter. The dough sheet is die cut. The portion dough is cooked in the linear oven and then frozen.

For one implementation, the oven is preheated to a temperature of about 400 degrees Fahrenheit, plus or minus 100 degrees Fahrenheit.

Dough Based Item for Pasta:

Referring to FIGS. 3A, 3B and 3C, an illustration of a manufacturing process flow for pasta meat dough is provided. This invention incorporates animal protein (by way of illustration chicken protein) into a traditional dough based pasta. For other implementations, one or more other proteins are incorporated, including turkey, fowl, pork, beef, mouton, and/or other animal meat based proteins utilized individually or with other proteins. Yet other implementations of the technology as disclosed and claimed herein utilize plant based proteins, such as soybean, taken individually or combined with other proteins. Further, modified plant proteins can be utilized, such as plant proteins modified with higher concentration of protein or plant proteins modified to resemble the protein of animal meat. This creates a more protein enriched pasta, both unfilled pasta and filled pasta, without sacrificing the pasta texture and flavor that consumers know and expect.

One method of manufacture includes a step of processing chicken breast meat and the natural proportion of chicken skin by finely grounding the meat protein at grinding size of approximately 0.8 mm to 1.4 mm. For one implementation of the technology, the protein source is size reduced. The size reduction can vary among sizes less than ½ inch depending on the application. One implementation of a method for manufacture of a dough based pasta including protein includes the step of grinding 304 poultry skin 302, ground chicken breast 306 and/or dark meat 310 (such as chicken thigh meat, drum meat and/or back meat, with or without skin) and feeding the skin and meat into a meat reduction 308 and meat emulsion system 312. Emulsifiers and stabilizers can be incorporated into a wide range of applications including bakery and confectionery, dairy and frozen desserts, beverages, oil and fats, sweet and savory snacks, meat products and more. The emulsifier and reducer in a meat system is used to solubilized (made more soluble) and reduce muscle protein. The solubilized and reduced protein is blended with other ingredients 314 in a blender 316, such as a paddle blender or any other comparable blender, for producing a meat dough 318. The emulsifier and reduction process solubilizes the meat and makes the meat more fluid and consistent in preparation for mixing with the other ingredients used for making dough based pasta in order to generate the meat dough product.

For one implementation, the portion of the process for making meat dough is performed in a raw room where the temperature is less than 45 degrees Fahrenheit and preferably lower than 40 degrees Fahrenheit. The raw dough internal temperature is preferably less than 40 degrees Fahrenheit. The meat dough 320 is rolled through a tri-roller 322, a double roller 324 and a reduction roller 326 to progressively reduce the thickness of a sheet of meat dough. The tri-roller decreases gradually the thickness of the dough sheet to approximately 4 mm to 6 mm The double roller further reduces the thickness of the dough to approximately 2.5 mm to 3.5 mm. The reduction roller further reduces the thickness of the dough sheet to approximately 1 mm to 1.2 mm. For one implementation of the process, approximately 8 to 12 weight percent flour dusting is applied to the surface of the meat pasta dough sheet to aid the sheeting process so that the meat pasta dough does not stick to the rollers. For one implementation of the process as disclosed herein, the dusting is applied between the tri-roller and the double roller step, and between the double roller and the reduction roller steps.

The sheet of meat dough is transitioned to an oven 328, where the meat dough sheet is cooked. The meat dough sheet is cut 330 into the sections desired for the pasta product. By way of illustration, a strip cutter is identified as the pasta cutting device. However, other types of pasta cutting devices are utilized depending on the type of pasta. The cut pasta is chilled 332. By way of illustration, one implementation of the process uses a $CO_2$ cooling tunnel to cool down the pasta product. However, other comparable cooling systems can be utilized. The cooking temperature, for one implementation, ranges from 325 to 375 degrees Fahrenheit and the cooking time for one implementation ranges from 4 to 8 minutes to thereby achieve a target internal product temperature of 170 degrees Fahrenheit as the product transitions from the oven. The meat dough based pasta product is weighed 334 and packaged 336 in an appropriate container and is inspected 337 for metal or other contaminants.

Referring to FIG. 3C, a process for filled meat dough items is provided, where the meat dough 338 sheets are produced in the same manner. However, there are parallel pathways as illustrated by 340 and 342 where multiple meat dough sheets are produced. The filling ingredients 344 are blended 345 and deposited 346 with a depositor between two or more sheets of meat dough and sections of the layers of meat dough with filling between the layers are crimped 348 to separate a section and enclose the filling between the sheets of meat dough thereby making a filled pasta item. The crimped away sections are cooked 350 in an oven and cooled 352 in a cooling tunnel. For one implementation of a filled meat dough product, the filling deposited between the layers of meat dough is one or more of a cheese filling, a spinach ricotto filling and a mushroom cheese filling. The product is packaged 354 and inspected 356.

Figure 4A:
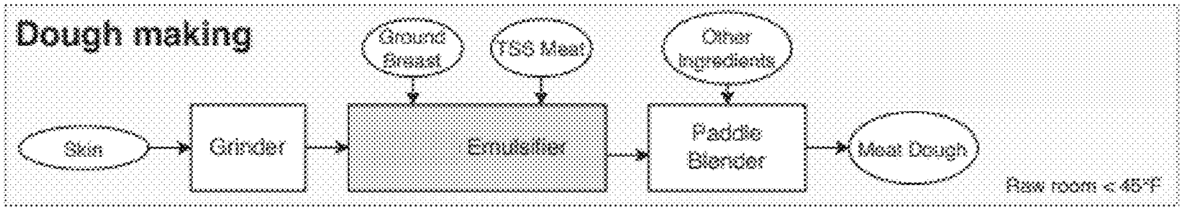
FIGS. 4A and 4B are an illustration of a process flow of the manufacturing method.
Figure 4B:
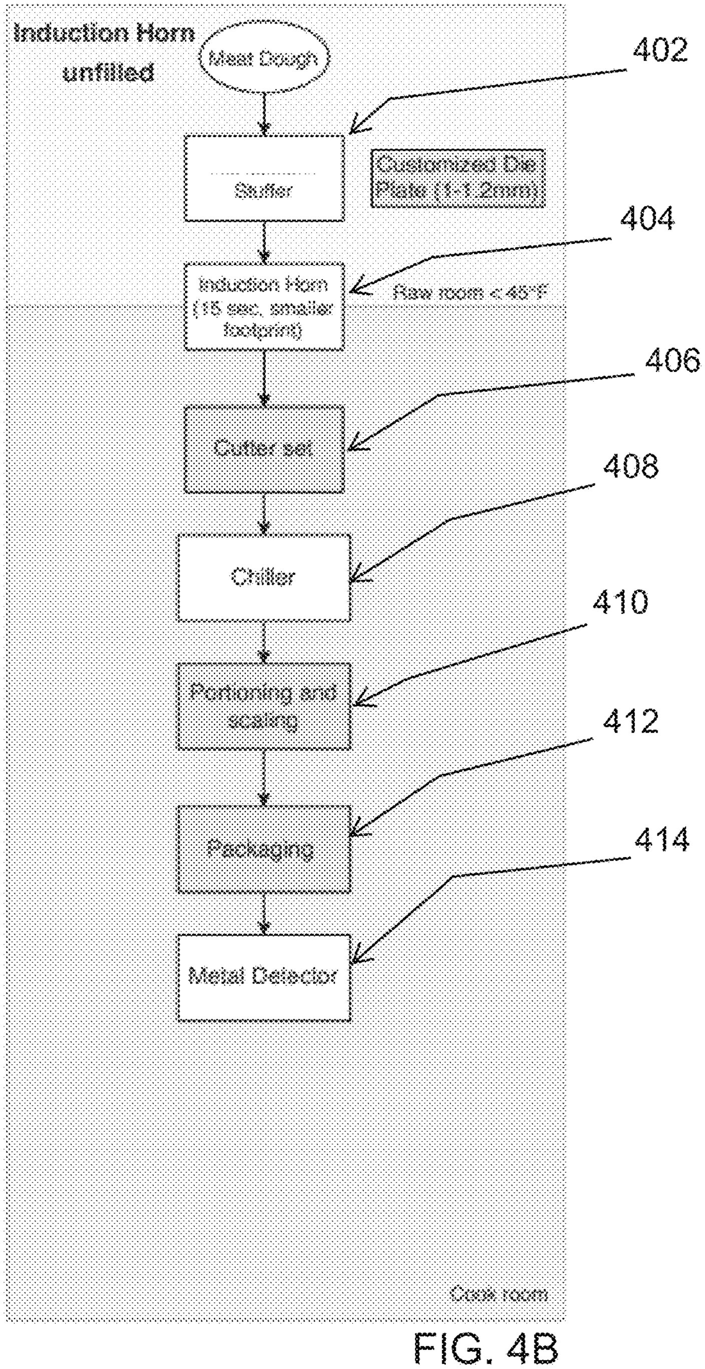

Referring to FIGS. 4A and 4B, an illustration of a manufacturing process flow for the manufacturing of pasta meat dough using a sheeting horn is provided. For one implementation, the method of sheeting the meat dough to the desired thickness is performed by a sheeting horn as illustrated in the process shown in FIGS. 4A and 4B. For one implementation, the sheeting horn is induction heated such that the meat dough is cooked and sheeted concurrently. The sheet of meat dough with this implementation is generated without the series of roller systems and without the need for an oven. For this implementation, the same process for making the meat can be utilized as performed in the raw room as illustrated in FIG. 4A. However, under this process, the meat dough is sent through a stuffer 402, which feeds into an induction horn 404. The balance of the process is the same; the protein pasta is processed through the pasta cutter 406, the chiller 408, the weighing 410, packaging 412 and detection 414.

Figure 4C:
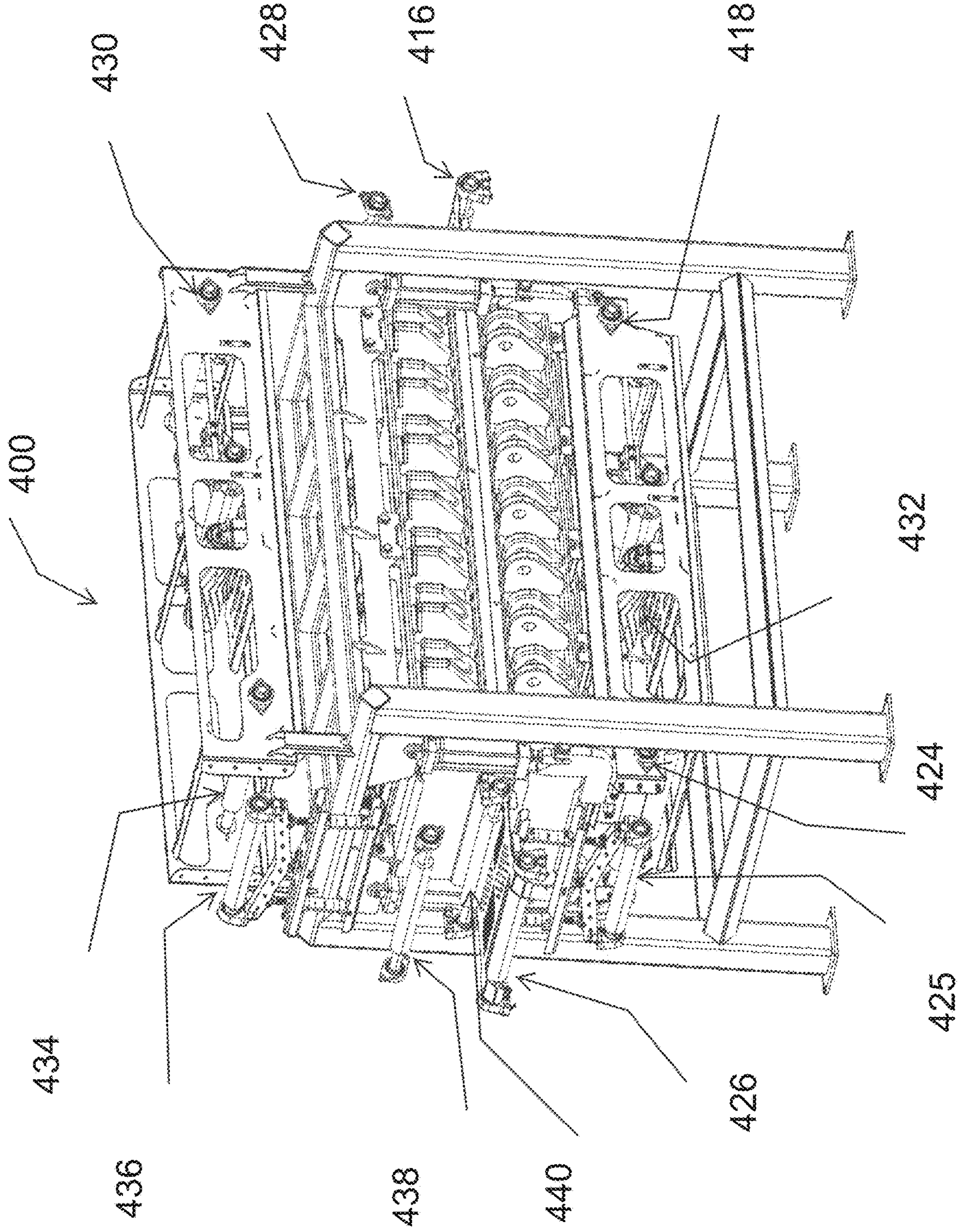
FIGS. 4C, 4D and 4E are an illustration of an induction sheeting horn.
Figure 4D:
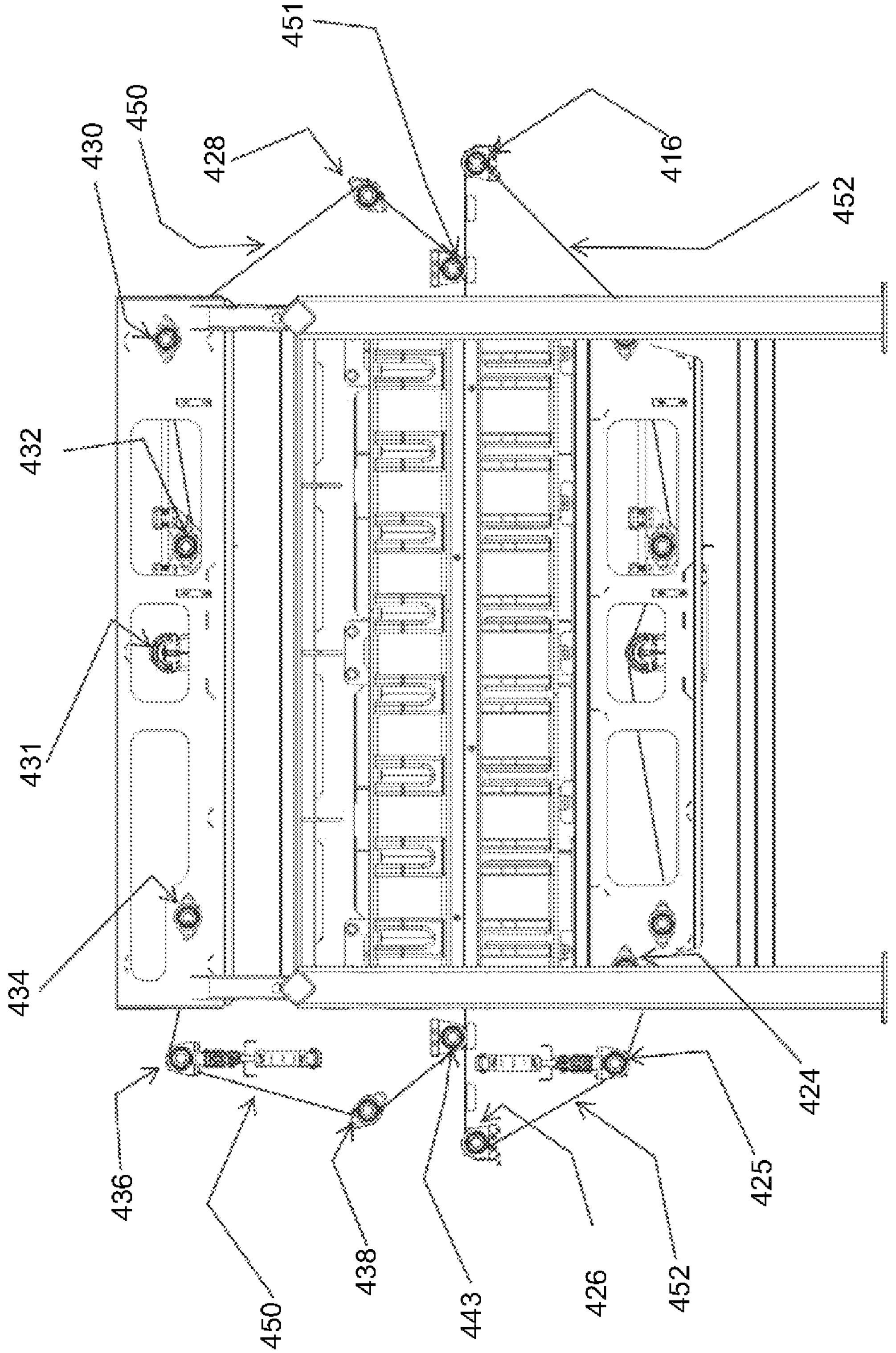
Figure 4E:
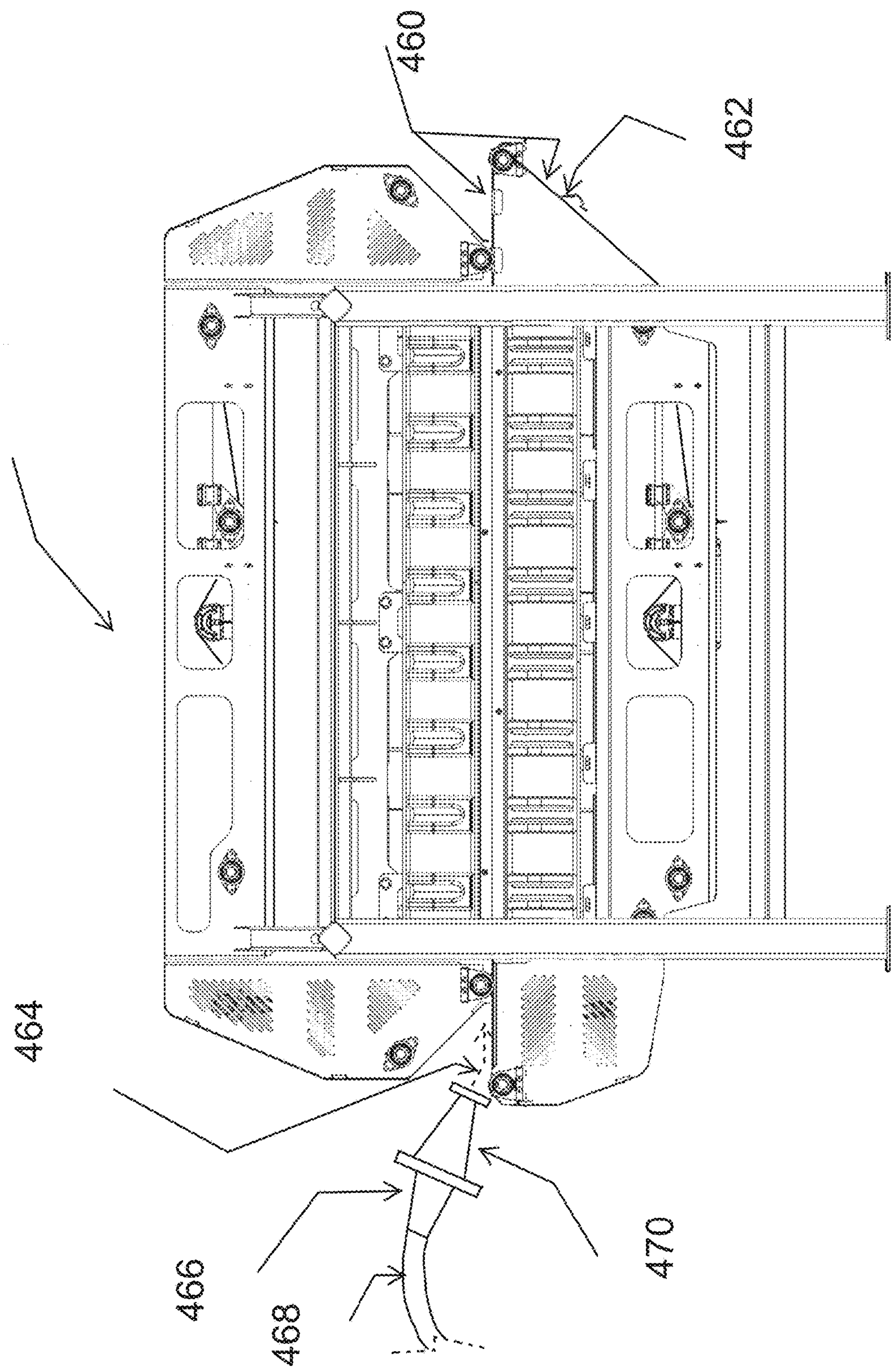

Referring to FIGS. 4C, 4D and 4E, an illustration of an induction sheeting horn is provided. A sheeting horn 400 of a sheeting horn assembly is illustrated including a cooking plate assembly 402 mounted on a support frame 404. The cooking plate 402 includes a top plate 406 having compression member mounts and tension cylinder mounts. The cooking plate assembly 402 further includes a bottom plate 408 having compression member mounts and tension cylinder mounts. The cooking plate assembly is mounted in a support frame 404. The upper and lower plates are compressed together by compression members and tension members. The interior cooking surface of the interior channel of the cooking plate assembly 402 through which the meat dough product travels is constructed of a material that provides a non-stick, low-friction coefficient surface so that the product as it is extruded through the cooking plate assembly is conveyed through at a faster rate such that the product doesn't back up, thereby assisting the product to flow through.

The thickness or height of the exit portal can be thin or narrow to achieve the desired thickness of the sheet of meat dough. The thickness of the exit portal also provides a certain meat dough product sheet thickness. The interior channel of the cooking plate assembly through which the product travels can have a graduated narrowing in thickness from the entry portal to the exit portal. The upper surface of the interior channel and the lower surface of the interior channel are proximately spaced apart, and for one implementation, slopes inwardly one with respect to the other, thereby having a graduated narrowing in thickness or height from the entry portal to the exit portal. The narrowing thickness or spacing could result in an increased pressure; however, this is counteracted by the reduced pressure under which the product is being pumped through the interior channel, and the non-stick, low-resistance surface of the interior channel. In one implementation, the widening of the interior channel can reduce pressure.

For one implementation of the cooking plate, the interior cooking surfaces of the interior channel are heated by induction heating. The cooking plate utilizes electrically conducting coils that generate eddy currents that cause the conductive plates to heat up. Induction heating is a non-contact method of heating a conductive body (i.e. plates) by utilizing a strong magnetic field from the specially designed coils. The coils do not contact the conductive plates. The conductive plates heat up responsive to its proximity to the strong magnetic field. The heated plates contact and heat up the meat. The advantage of an inductive heating system and method is that the heating temperature of the plates can reach a very high temperature (approximately 500 degrees Fahrenheit) in a short period of time and the surface temperature of the plates can be controlled by adjusting the power output to the coils. An induction heater consists of an electromagnet, and an electronic oscillator that passes a high-frequency alternating current (AC) through the electromagnet. The rapidly alternating magnetic field penetrates the object, generating electric currents inside a conductor called eddy currents. The eddy currents flowing through the resistance of the material heat it by Joule heating. In ferromagnetic (and ferromagnetic materials like iron), heat may also be generated by magnetic hysteresis losses. The frequency of current used depends on the object size, material type, coupling (between the working coil and the object to be heated) and the penetration depth. An important feature of the induction heating process is that the heat is generated inside the object itself, instead of by an external heat source via heat conduction. Therefore, product can be heated very rapidly. In addition, there need not be any external contact.

Therefore, the interior cooking surface of the cooking plate as disclosed and claimed herein can be heated by induction heating. Induction cooking is quite efficient, which means it puts less waste heat into the surrounding assembly. Induction heating can be quickly turned on and off, and is easily controlled for heating level. Induction cooking provides faster heating, improved thermal efficiency, and more consistent heating than cooking by thermal conduction, with more precise control over the heat provided. Therefore, the heat applied by the interior cooking surface to the product can be more precisely controlled.

As indicated, the narrow thickness between the upper and lower plates could result in an increased pressure, which for one implementation is counteracted by the reduced pressure under which the product is being pumped through the interior channel, and the non-stick, low-resistance surface (low-friction) of the upper and lower surfaces of the interior channel. However, for some thicknesses, the reduced pressure and the low-friction surface isn't sufficient to counteract the increased pressure. However, for one implementation as illustrated in FIGS. 4C through 4E, the increased pressure is addressed by an upper and lower conveyor belt that convey through the extrusion interior channel extending between the plates along the upper and lower cooking plates, respectively. The upper and lower conveyors convey in the direction of the flow of the extrusion to thereby assist the flow of extrusion, thereby addressing the increased pressure and potential backup of the extrusion flow. The speed of the upper and lower conveyors is variable to adapt to the pressure of the influx of meat dough, the internal channel pressure, and the consistency of the meat dough product.

Also, there is a non-stick coating on the surface of the upper and lower belts that contact the product. The belts are constructed of a material such that the heat transfer coefficient is sufficient to adequately transfer heat from the upper and lower cooking plates to the meat dough product being extruded.

The cooking surface of the belts that contacts the product as the belts traverse through the channel in the direction of flow of the interior channel of the cooking plate through which the product travels is constructed of a material that provides a non-stick, low-resistance (low-friction) surface so that the product as it is extruded through the cooking plate is conveyed through without substantially impacting the flow and preventing the conveyors from causing the product to backup, thereby assisting the product to not form a continuous mass or sheet. Due to the non-stick surfaces of the conveyor belt, the denaturing of the product by heating, the height of the narrow interior channel, the speed of the belts, and gravity, the product tends to remain on and cling to the lower belt of the lower conveyor and not cling to the upper belt of the upper conveyor.

Referring to FIGS. 4C through 4E, a sheeting horn assembly is illustrated including a cooking plate assembly 402 mounted on a frame 404. The sheeting horn assembly 400 includes an upper conveyor having an upper entry end return run and an upper exit end return run. The assembly further includes a lower conveyor having a lower entry end return run and a lower exit end return run. The upper conveyor top run travels over the conveyor pulley rollers 428, 430, 432, 431, 434, 438, 440, 443, 451 and 436. The bottom run of the upper conveyor, extends through the interior channel along the upper plates interior surface. The outward facing surface of the upper belt 450 contacts the product as the product travels through the interior channel extending between the cooking plates. The inward facing surface of the upper belt extends immediately adjacent the upper plate's interior surface. Heat is transferred from the upper plate to the upper belt and the upper belt's outer surface 450 is heated and contacts the meat dough product being extruded through the interior channel.

The lower conveyor bottom run travels over the conveyor pulley rollers 416, 418, 425, 424, 426 and 427. The top run of the lower conveyor, extends through the interior channel along the lower plate's interior surface. The outward facing surface of the upper belt 452 contacts the product as the product travels through the channel. The inward facing surface of the lower belt extends immediately adjacent the lower plate's interior surface. Heat is transferred from the lower plate to the lower belt and the lower belt's outer surface is heated and contacts the product being extruded through the interior channel. The outer surfaces of the upper and lower belts, 450 and 460, respectively, are non-stick material, which is one of metal, Teflon or other comparable non-stick material. For one implementation, scrapper rollers are utilized to remove any remaining product from the outer surface of the belt after traversing through the interior channel. Other scrappers 462 can also be used to remove debris.

On the product entry end, product is extruded through an extrusion line 468 and through a compression nozzle 466 and further through a sheeter nozzle 470. The sheeter nozzle has an exit opening that is a long, narrow opening that extends horizontally and is substantially parallel to the belt of the lower conveyor. Thin, non-continuous sheeted product flows out of the exit opening of the sheeter nozzle and onto the belt of the lower conveyor and in the direction as indicated by directional arrow 464, which is conveyed through the channel between the upper and lower cooking plates.

For one implementation of the technology, an extrusion horn includes an upper cooking plate having an upper interior cooking surface and a lower cooking plate having a lower interior cooking surface, where the upper interior cooking surface and the lower interior cooking surface face each other, and where said upper interior cooking surface is proximately spaced apart from the lower interior cooking surface with a spacing, where the spacing is defined by a spacer gasket extending lengthwise along the upper and lower cooking plates and said spacer gasket positioned between the upper interior cooking surface and the lower interior cooking surface thereby forming a lengthwise interior extrusion channel having an entry opening and an exit opening. One implementation further includes a conveyor having an endless conveyor belt where one of an upper run of the endless conveyor belt and a lower run of the endless conveyor belt extends lengthwise and conveys through the lengthwise interior extrusion channel.

For one implementation, the conveyor is an upper conveyor and where the endless conveyor belt is an upper endless conveyor belt, and where a lower run of the upper endless conveyor belt extends lengthwise and conveys immediately adjacent the upper interior cooking surface and through the lengthwise interior extrusion channel. For yet another implementation, the conveyor is a lower conveyor and where the endless conveyor belt is a lower endless conveyor belt, and where an upper run of the lower endless conveyor belt extends lengthwise and conveys immediately adjacent the lower interior cooking surface and through the lengthwise interior extrusion channel. For one implementation, the conveyor is an upper conveyor having an upper endless conveyor belt, where a lower run of the upper endless conveyor belt extends lengthwise and conveys immediately adjacent the upper interior cooking surface and through the lengthwise interior extrusion channel.

For one implementation of the extrusion horn, a power source is coupled to the upper and lower cooking plates through an interface that provides energy that raises the temperature of the cooking plates and the upper and lower interior cooking surfaces. For one implementation, the interface includes, an upper induction coil positioned proximate the upper cooking plate and on an opposing side of the upper cooking plate opposite the upper interior cooking surface, and a lower induction coil positioned proximate the lower cooking plate and on an opposing side of the lower cooking plate opposite the lower interior cooking surface.

The gap between the upper and the lower interior surfaces of the upper and lower cooking plates can be adjusted to keep pressure on the dough sheet to maintain thickness during the heating process since protein pasta dough will have the tendency to swell, which tends to increase the thickness of the dough sheet after it has been heated. The extruded dough sheet can maintain same thickness during the cooking process by using the extrusion cooking horn. The cooking time is much shorter (at least 5 time shorter) compared with conventional cooking methods since the heat energy is delivered by conduction which is much higher heat transfer efficiency than conventional heating methods. For one implementation, the meat dough past sheet will spend 30 seconds or less in the induction horn, where the target internal temperature of the dough sheet exiting the induction horn is in the range of 160 degrees Fahrenheit and 170 degrees Fahrenheit, preferably, 165 degrees Fahrenheit.

The various implementations and examples shown above illustrate a method of manufacture and composition for a dough based pasta having protein. A user of the present method and system may choose any of the above implementations, or an equivalent thereof, depending upon the desired application. In this regard, it is recognized that various forms of the subject tortilla with protein method of manufacture and composition could be utilized without departing from the scope of the present technology and various implementations as disclosed.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present implementation(s). Accordingly, the specification and drawings are to be regarded in an illustrative rather than a restrictive sense.

Other aspects, objects and advantages of the present technology as disclosed can be obtained from a study of the drawings, the disclosure and the appended claims.

What is claimed is:

1. A dough based pasta item comprising:

a pasta dough and animal meat composition comprising, by weight of total mixture: 30% to 60% percent animal meat protein, 20% to 30% water, 10% to 15% non-animal protein, 5% to 10% flour, 0.5% to 2% oil and 0.1% to 0.5% of a binder.

2. The dough based pasta item as recited in claim 1, wherein the non-animal protein comprises 10.4% to 15% pea protein, the flour comprises 4.8% to 7.2% durum wheat semolina, the binder comprises 0.1% to 0.5% locust bean gum, and wherein the meat dough composition further comprises by weight of total mixture: 9% to 12% vital wheat gluten, 2% to 3.5% cane vinegar, 0.75% to 1.75% potassium chloride, 0.2% to 0.4% xanthan gum, and 0.2% to 0.4% liquid rosemary extract.

3. The dough based pasta item as recited in claim 2, where the animal protein comprises one or more of 25% to 30% chicken thigh; 8.5% to 9.5% ground breast, and 1.75% to 2.75% chicken skin.

4. The dough based pasta item as recited in claim 3, where oil comprises 0.5% to 1% extra virgin olive oil.

5. The dough based pasta item as recited in claim 4, comprising:

dry ingredients added for one or more of flavor and increased shelf life.

6. The dough based pasta item as recited in claim 5, where the protein is ground to less than 3/32 of an inch and emulsified, or ground to less than 2/32 of an inch and emulsified.

7. The dough based pasta item as recited in claim 4, further comprising:

a filling composition applied or filled in the dough based pasta, said filling composition comprising one or more of a cheese, spinach and mushroom filling.

* * * * *